(12) United States Patent
Sengupta et al.

(10) Patent No.: US 12,250,695 B2
(45) Date of Patent: Mar. 11, 2025

(54) BUNDLING AND TIMELINE DETERMINATION FOR MULTIPLE TRANSPORT BLOCKS SCHEDULED BY A SINGLE DOWNLINK CONTROL INFORMATION MESSAGE

(71) Applicant: Qualcomm Incorporated, San Diego, CA (US)

(72) Inventors: Ayan Sengupta, San Diego, CA (US); Alberto Rico Alvarino, San Diego, CA (US); Le Liu, San Jose, CA (US); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 359 days.

(21) Appl. No.: 17/632,813

(22) PCT Filed: Aug. 10, 2020

(86) PCT No.: PCT/CN2020/108084
§ 371 (c)(1),
(2) Date: Feb. 4, 2022

(87) PCT Pub. No.: WO2021/031892
PCT Pub. Date: Feb. 25, 2021

(65) Prior Publication Data
US 2022/0287069 A1 Sep. 8, 2022

(30) Foreign Application Priority Data
Aug. 16, 2019 (WO) ................ PCT/CN2019/101049

(51) Int. Cl.
*H04W 72/23* (2023.01)
*H04L 1/1607* (2023.01)

(52) U.S. Cl.
CPC ........... *H04W 72/23* (2023.01); *H04L 1/1614* (2013.01); *H04L 1/1635* (2013.01)

(58) Field of Classification Search
None
See application file for complete search history.

(56) References Cited

U.S. PATENT DOCUMENTS 8,885,526 B2 11/2014 He et al.
10,873,936 B2 * 12/2020 Huang .................. H04L 5/0098
(Continued)

FOREIGN PATENT DOCUMENTS

CN 101789851 A 7/2010
CN 107210889 A 9/2017
(Continued)

OTHER PUBLICATIONS

Supplementary Partial European Search Report—EP20854039—Search Authority—The Hague—Jun. 1, 2023 (194510EP).
(Continued)

*Primary Examiner* — Xavier S Wong
(74) *Attorney, Agent, or Firm* — Holland & Hart LLP

(57) ABSTRACT

Methods, systems, and devices for wireless communications are described. A user equipment (UE) may receive a downlink control information (DCI) message from a base station that schedules multiple transport blocks (TBs) to be transmitted to the UE. Accordingly, the UE may determine a bundling configuration for grouping the multiple TBs into separate groups of TBs such that separate acknowledgment (ACK) feedback messages are transmitted by the UE for each group of TBs to indicate whether each of the TBs in each TB group was correctly received and decoded. In some cases, the UE may determine the bundling configuration based on radio resource control signaling from the base station, DCI signaling from the base station, relationships or (Continued)

equations or tables defined for the UE, or a combination thereof. Additionally, the UE may determine resource locations and timelines for transmitting the separate ACK feedback messages.

27 Claims, 18 Drawing Sheets

(56) References Cited

U.S. PATENT DOCUMENTS

| | | | | |
|---|---|---|---|---|
| 2012/0039227 | A1* | 2/2012 | Chen | H04L 5/0098 455/522 |
| 2012/0281570 | A1* | 11/2012 | Jung | H04L 1/1854 370/252 |
| 2014/0334392 | A1* | 11/2014 | Gage | H04L 5/0092 370/329 |
| 2015/0237644 | A1* | 8/2015 | Golitschek Edler von Elbwart | H04L 1/1893 370/329 |
| 2016/0226643 | A1 | 8/2016 | Mallik et al. | |
| 2016/0277148 | A1* | 9/2016 | Heinle | H04L 1/1874 |
| 2017/0280447 | A1* | 9/2017 | Uchino | H04L 5/0055 |
| 2018/0019842 | A1 | 1/2018 | Fu et al. | |
| 2019/0174283 | A1 | 6/2019 | Awad | |

FOREIGN PATENT DOCUMENTS

| | | |
|---|---|---|
| CN | 110073622 A | 7/2019 |
| WO | WO-2017044066 A1 | 3/2017 |
| WO | WO-2018119750 A1 | 7/2018 |
| WO | WO-2019072074 A1 | 4/2019 |
| WO | WO-2019093499 A1 | 5/2019 |

OTHER PUBLICATIONS

Huawei., et al., "Scheduling of Multiple Transport Blocks," 3GPP Draft, 3GPP TSG RAN WG1 Meeting #97, R1-1905979, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051727436, 9 pages, Sections 2 and 3, Chapters 1 to 2, 3.1 and 3.6.
Taiwan Search Report—TW109127037—TIPO—Feb. 7, 2024 (194510TW).
Ericsson: "Updated Feature Lead Summary for Scheduling of Multiple DL/UL Transport Blocks for LTE-MTC", 3GPP TSG-RAN WG1 Meeting #97, R1-1907617, Reno, USA, May 13-17, 2019, May 16, 2019, pp. 1-21, Sections 1—Annex A.
Huawei, et al., "Scheduling Multiple DL/UL Transport Blocks," 3GPP TSG RAN WG1 Meeting #96bis, R1-1903911, Apr. 12, 2019 (Apr. 12, 2019), section 3, figures 2 and 6, 14 pages, Section1-4.
International Search Report and Written Opinion—PCT/CN2020/108084—ISA/EPO—Oct. 28, 2020 (194510WO2).
International Search Report and Written Opinion—PCT/CN2019/101049—ISA/EPO—Apr. 26, 2020 (194510WO1).
Supplementary European Search Report—EP20854039—Search Authority—The Hague—Sep. 1, 2023 (194510EP).

* cited by examiner

BUNDLING AND TIMELINE DETERMINATION FOR MULTIPLE TRANSPORT BLOCKS SCHEDULED BY A SINGLE DOWNLINK CONTROL INFORMATION MESSAGE

CROSS REFERENCE TO RELATED APPLICATIONS

The present Application is a 371 national stage filing of International PCT Application No. PCT/CN2020/108084 by Sengupta et al., entitled "BUNDLING AND TIMELINE DETERMINATION FOR MULTIPLE TRANSPORT BLOCKS SCHEDULED BY A SINGLE DOWNLINK CONTROL INFORMATION MESSAGE," filed Aug. 10, 2020; and claims priority to International Patent Application No. PCT/CN2019/101049 by Sengupta et al., entitled "BUNDLING AND TIMELINE DETERMINATION FOR MULTIPLE TRANSPORT BLOCKS SCHEDULED BY A SINGLE DOWNLINK CONTROL INFORMATION MESSAGE," filed Aug. 16, 2019, each of which is assigned to the assignee hereof, and each of which is expressly incorporated by reference in its entirety herein.

BACKGROUND

The following relates generally to wireless communications, and more specifically to bundling and timeline determination for multiple transport blocks (TBs) scheduled by a single downlink control information (DCI) message.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may transmit one or more downlink signals (e.g., in a TB) to a UE. The UE may then be expected to transmit feedback to the base station to indicate whether the one or more downlink signals have been received and decoded successfully. For example, the UE may transmit a positive acknowledgment (ACK) feedback message to the base station to indicate the downlink signals were correctly received and decoded and may transmit a negative ACK (NACK) feedback message to indicate the downlink signals were not correctly received and/or decoded. Efficient techniques are desired for preparing ACK/NACK feedback messages for received downlink signals.

SUMMARY

The described techniques relate to improved methods, systems, devices, and apparatuses that support bundling and timeline determination for multiple transport blocks (TBs) scheduled by a single downlink control information (DCI) message. Generally, the described techniques provide for a user equipment (UE) to receive a DCI message from a base station that schedules multiple TBs to be transmitted to the UE. Accordingly, the UE may determine a bundling configuration for grouping the multiple TBs into separate groups of TBs (e.g., TB bundles) such that separate acknowledgment (ACK) feedback messages are transmitted by the UE for each group of TBs to indicate whether each of the TBs in each TB group was correctly received and decoded. In some cases, the UE may determine the bundling configuration based on radio resource control (RRC) signaling from the base station, DCI signaling from the base station, relationships/equations/tables defined for the UE, or a combination thereof. Additionally, the UE may determine resource locations and timelines (e.g., instances in time) for transmitting the separate ACK feedback messages (e.g., bundled ACK feedback). For example, the resource locations and timelines for the ACK feedback messages may be determined based on RRC/DCI parameters signaled by the base station, interleaving parameters, processing and decoding gaps, numbers of downlink and uplink channel repetitions (e.g., for the TBs and ACK feedback messages, respectively), scheduling delay fields, the bundling configuration, etc.

A method of wireless communications at a UE is described. The method may include receiving a DCI message scheduling the UE to receive a set of TBs, identifying a bundling configuration for grouping individual ones of the set of TBs into groups and for reporting bundled ACK feedback for each of the groups of TBs, receiving the set of TBs, and transmitting the bundled ACK feedback for each of the groups of TBs based on receiving the set of TBs.

An apparatus for wireless communications at a UE is described. The apparatus may include a processor, memory coupled with the processor, and instructions stored in the memory. The instructions may be executable by the processor to cause the apparatus to receive a DCI message scheduling the UE to receive a set of TBs, identify a bundling configuration for grouping individual ones of the set of TBs into groups and for reporting bundled ACK feedback for each of the groups of TBs, receive the set of TBs, and transmit the bundled ACK feedback for each of the groups of TBs based on receiving the set of TBs.

Another apparatus for wireless communications at a UE is described. The apparatus may include means for receiving a DCI message scheduling the UE to receive a set of TBs, identifying a bundling configuration for grouping individual ones of the set of TBs into groups and for reporting bundled ACK feedback for each of the groups of TBs, receiving the set of TBs, and transmitting the bundled ACK feedback for each of the groups of TBs based on receiving the set of TBs.

A non-transitory computer-readable medium storing code for wireless communications at a UE is described. The code may include instructions executable by a processor to receive a DCI message scheduling the UE to receive a set of TBs, identify a bundling configuration for grouping individual ones of the set of TBs into groups and for reporting bundled ACK feedback for each of the groups of TBs, receive the set of TBs, and transmit the bundled ACK feedback for each of the groups of TBs based on receiving the set of TBs.

In some examples of the method, apparatuses, and non-transitory computer-readable medium described herein, identifying the bundling configuration may include operations, features, means, or instructions for determining a number of scheduled TBs based on a DCI indication, where the bundling configuration may be based on the number of scheduled TBs.

In some examples of the method, apparatuses, and non-transitory computer-readable medium described herein, the number of scheduled TBs may be determined based on a bitmap field, hybrid automatic request (HARQ) identification parameter, or a combination thereof included in the DCI indication.

In some examples of the method, apparatuses, and non-transitory computer-readable medium described herein, identifying the bundling configuration may include operations, features, means, or instructions for receiving, in a DCI indication, an explicit indication of the bundling configuration from a set of possible bundling configurations.

Some examples of the method, apparatuses, and non-transitory computer-readable medium described herein may further include operations, features, means, or instructions for determining a number of scheduled TBs, where the explicit indication of the bundling configuration may be based on the number of scheduled TBs.

In some examples of the method, apparatuses, and non-transitory computer-readable medium described herein, the explicit indication of the bundling configuration may be jointly encoded with one or more identifiers associated with a HARQ bitmap to provide valid, non-redundant combinations of HARQ bitmaps and bundling configurations.

In some examples of the method, apparatuses, and non-transitory computer-readable medium described herein, identifying the bundling configuration may include operations, features, means, or instructions for receiving a bundling indication via RRC signaling, a DCI indication, or a combination thereof.

In some examples of the method, apparatuses, and non-transitory computer-readable medium described herein, a number of TBs in each group of TBs may be less than the total number of TBs in the set of TBs, and the sum of the TBs from each group of TBs may be equal to the total number of TBs in the set of TBs.

In some examples of the method, apparatuses, and non-transitory computer-readable medium described herein, identifying the bundling configuration may include operations, features, means, or instructions for receiving a bundling parameter indicating a maximum size of a TB group for the groups of TBs.

In some examples of the method, apparatuses, and non-transitory computer-readable medium described herein, identifying the bundling configuration may include operations, features, means, or instructions for receiving multiple bundling parameters indicating maximum sizes of TB groups for different numbers of scheduled TBs.

In some examples of the method, apparatuses, and non-transitory computer-readable medium described herein, identifying the bundling configuration may include operations, features, means, or instructions for receiving multiple bundling parameters indicating maximum sizes of TB groups for different numbers of scheduled TBs and threshold values on the number of scheduled TBs to determine which bundling parameter to use, the threshold values based on a number of uplink channel repetitions for transmitting the bundled ACK feedback.

In some examples of the method, apparatuses, and non-transitory computer-readable medium described herein, identifying the bundling configuration may include operations, features, means, or instructions for receiving an explicit indication of the bundling configuration.

In some examples of the method, apparatuses, and non-transitory computer-readable medium described herein, identifying the bundling configuration may include operations, features, means, or instructions for receiving a set of possible bundling configurations and DCI signals that correspond to at least one possible bundling configuration.

In some examples of the method, apparatuses, and non-transitory computer-readable medium described herein, identifying the bundling configuration may include operations, features, means, or instructions for receiving an indication of a number of uplink channel resources that can be used for transmitting the bundled ACK feedback.

In some examples of the method, apparatuses, and non-transitory computer-readable medium described herein, the number of uplink channel resources may be based on the number of TBs scheduled.

In some examples of the method, apparatuses, and non-transitory computer-readable medium described herein, identifying the bundling configuration may include operations, features, means, or instructions for receiving an ACK delay value.

In some examples of the method, apparatuses, and non-transitory computer-readable medium described herein, identifying the bundling configuration may include operations, features, means, or instructions for determining a bundling indication based on a bundling relationship defined for the UE.

In some examples of the method, apparatuses, and non-transitory computer-readable medium described herein, the bundling relationship may include a relationship between a maximum number of TBs that can be scheduled by a single DCI message, a number of scheduled TBs, a bundling parameter indicating a maximum size of a TB group for the groups of TBs, a threshold value on the number of scheduled TBs to determine which bundling parameter to use, a number of uplink channel resources that can be used for transmitting the ACK feedback, an ACK delay value, a bundling enable signal, a bundling disable signal, whether interleaving of TB repetitions may be enabled, a granularity for inter-TB interleaving, an interleaving pattern used, a number of uplink channel repetitions configured for the ACK feedback, or a combination thereof.

A method of wireless communications at a UE is described. The method may include receiving a DCI message scheduling the UE to receive a set of TBs, the DCI message including a bundling configuration for grouping individual ones of the set of TBs into groups and for reporting bundled ACK feedback for each of the groups of TBs, determining instances in time for transmitting the bundled ACK feedback for each of the groups of TBs, receiving the set of TBs, and transmitting the bundled ACK feedback for each of the groups of TBs based on the determined instances in time.

An apparatus for wireless communications at a UE is described. The apparatus may include a processor, memory coupled with the processor, and instructions stored in the memory. The instructions may be executable by the processor to cause the apparatus to receive a DCI message scheduling the UE to receive a set of TBs, the DCI message including a bundling configuration for grouping individual ones of the set of TBs into groups and for reporting bundled ACK feedback for each of the groups of TBs, determine instances in time for transmitting the bundled ACK feedback for each of the groups of TBs, receive the set of TBs, and transmit the bundled ACK feedback for each of the groups of TBs based on the determined instances in time.

Another apparatus for wireless communications at a UE is described. The apparatus may include means for receiving a DCI message scheduling the UE to receive a set of TBs, the DCI message including a bundling configuration for grouping individual ones of the set of TBs into groups and for reporting bundled ACK feedback for each of the groups of TBs, determining instances in time for transmitting the bundled ACK feedback for each of the groups of TBs, receiving the set of TBs, and transmitting the bundled ACK feedback for each of the groups of TBs based on the determined instances in time.

A non-transitory computer-readable medium storing code for wireless communications at a UE is described. The code may include instructions executable by a processor to receive a DCI message scheduling the UE to receive a set of TBs, the DCI message including a bundling configuration for grouping individual ones of the set of TBs into groups and for reporting bundled ACK feedback for each of the groups of TBs, determine instances in time for transmitting the bundled ACK feedback for each of the groups of TBs, receive the set of TBs, and transmit the bundled ACK feedback for each of the groups of TBs based on the determined instances in time.

Some examples of the method, apparatuses, and non-transitory computer-readable medium described herein may further include operations, features, means, or instructions for determining the instances in time based on a satisfaction of one or more time constraints.

In some examples of the method, apparatuses, and non-transitory computer-readable medium described herein, the one or more time constraints may include at least a first constraint type and a second constraint type, and the instances in time may be determined based on a simultaneous satisfaction of the first constraint type and the second constraint type.

In some examples of the method, apparatuses, and non-transitory computer-readable medium described herein, the one or more time constraints may include a minimum gap for decoding a downlink channel between receipt of the downlink channel and transmission of the bundled ACK feedback, that the bundled ACK feedback for each of the groups of TBs does not overlap in time, or a combination thereof.

In some examples of the method, apparatuses, and non-transitory computer-readable medium described herein, the one or more time constraints may include a half-duplex capability of the UE or a full duplex capability of the UE.

In some examples of the method, apparatuses, and non-transitory computer-readable medium described herein, the one or more time constraints may include a time division duplexing (TDD) mode of operation or a frequency division duplexing (FDD) mode of operation.

In some examples of the method, apparatuses, and non-transitory computer-readable medium described herein, the satisfaction of the one or more time constraints may be based on a maximum number of TBs that can be scheduled by a single DCI message, a number of scheduled TBs, a bundling parameter indicating a maximum size of a TB group for the groups of TBs, a number of uplink channel resources that can be used for transmitting the ACK feedback, an ACK delay value, or a combination thereof.

In some examples of the method, apparatuses, and non-transitory computer-readable medium described herein, the satisfaction of the one or more time constraints may be based on a bundling enable signal, a bundling disable signal, the identified bundling configuration, or a combination thereof.

In some examples of the method, apparatuses, and non-transitory computer-readable medium described herein, the satisfaction of the one or more time constraints may be based on whether interleaving of TB repetition may be enabled, a granularity for inter-TB interleaving, an interleaving pattern used, a number of uplink channel repetitions configured for the ACK feedback, or a combination thereof.

Some examples of the method, apparatuses, and non-transitory computer-readable medium described herein may further include operations, features, means, or instructions for determining a starting location of the instances in time for transmitting the bundled ACK feedback based on an ACK scheduling delay field received in the DCI message, a number of subframes for the bundled ACK feedback, a number of downlink transmission subframes based on a repetition number field and resource assignment field, a minimum time interval between an end of the set of TBs and a start of the bundled ACK feedback, or a combination thereof.

Some examples of the method, apparatuses, and non-transitory computer-readable medium described herein may further include operations, features, means, or instructions for determining a first starting location for transmitting a first bundled ACK feedback for a first group of TBs of the set of TBs, where the first starting location may be based on a first constraint type, and determining a second starting location for transmitting one or more additional bundled acknowledgment feedbacks for remaining groups of TBs after the first group of TBs, where the second starting location may be based on a second constraint type.

In some examples of the method, apparatuses, and non-transitory computer-readable medium described herein, the first constraint type may include a first minimum time interval between an end of the first group of TBs and a start of the first bundled ACK feedback, a second minimum interval between an end of a last TB of the set of TBs and the start of the first bundled ACK feedback, or a combination thereof; and the second constraint type may include a third minimum time interval between an end of a corresponding group of TBs from the remaining groups of TBs and a start of one of the additional bundled ACK feedbacks for the corresponding group of TBs, a fourth minimum time interval between an end of a previous bundled ACK feedback and the start of one of the additional bundled ACK feedbacks, the number of downlink transmission subframes based on the repetition number field and resource assignment field, or a combination thereof.

In some examples of the method, apparatuses, and non-transitory computer-readable medium described herein, the minimum time interval between the end of the set of TBs and the start of the bundled ACK feedback may be fixed, equal to ACK scheduling delay field, or a combination thereof.

Some examples of the method, apparatuses, and non-transitory computer-readable medium described herein may further include operations, features, means, or instructions for determining a starting location of the instances in time for transmitting the bundled ACK feedback based on an ACK scheduling delay field received in the DCI message, a number of subframes for the bundled ACK feedback, a granularity of interleaving indicating a number of repetitions of a downlink channel used as a base unit for inter-TB interleaving, a minimum time interval between an end of the set of TBs and a start of the bundled ACK feedback, or a combination thereof.

In some examples of the method, apparatuses, and non-transitory computer-readable medium described herein, a number of TBs in each group of TBs may be less than the total number of TBs in the set of TBs, and the sum of the TBs from each group of TBs may be equal to the total number of TBs in the set of TBs.

A method of wireless communications at a base station is described. The method may include transmitting, to a UE, a DCI message scheduling the UE to receive a set of TBs, transmitting, to the UE, a bundling indication to enable the UE to group individual ones of the set of TBs into groups and for the UE to transmit bundled ACK feedback for each of the groups of TBs, transmitting, to the UE, the set of TBs, and receiving, from the UE, the bundled ACK feedback for each of the groups of TBs.

An apparatus for wireless communications at a base station is described. The apparatus may include a processor, memory coupled with the processor, and instructions stored in the memory. The instructions may be executable by the processor to cause the apparatus to transmit, to a UE, a DCI message scheduling the UE to receive a set of TBs, transmit, to the UE, a bundling indication to enable the UE to group individual ones of the set of TBs into groups and for the UE to transmit bundled ACK feedback for each of the groups of TBs, transmit, to the UE, the set of TBs, and receive, from the UE, the bundled ACK feedback for each of the groups of TBs.

Another apparatus for wireless communications at a base station is described. The apparatus may include means for transmitting, to a UE, a DCI message scheduling the UE to receive a set of TBs, transmitting, to the UE, a bundling indication to enable the UE to group individual ones of the set of TBs into groups and for the UE to transmit bundled ACK feedback for each of the groups of TBs, transmitting, to the UE, the set of TBs, and receiving, from the UE, the bundled ACK feedback for each of the groups of TBs.

A non-transitory computer-readable medium storing code for wireless communications at a base station is described. The code may include instructions executable by a processor to transmit, to a UE, a DCI message scheduling the UE to receive a set of TBs, transmit, to the UE, a bundling indication to enable the UE to group individual ones of the set of TBs into groups and for the UE to transmit bundled ACK feedback for each of the groups of TBs, transmit, to the UE, the set of TBs, and receive, from the UE, the bundled ACK feedback for each of the groups of TBs.

In some examples of the method, apparatuses, and non-transitory computer-readable medium described herein, transmitting the bundling indication may include operations, features, means, or instructions for transmitting a bundling parameter indicating a maximum size of a TB group for the groups of TBs.

In some examples of the method, apparatuses, and non-transitory computer-readable medium described herein, transmitting the bundling indication may include operations, features, means, or instructions for transmitting multiple bundling parameters indicating maximum sizes of TB groups for different numbers of scheduled TBs.

In some examples of the method, apparatuses, and non-transitory computer-readable medium described herein, transmitting the bundling indication may include operations, features, means, or instructions for transmitting multiple bundling parameters indicating maximum sizes of TB groups for different numbers of scheduled TBs and threshold values on the number of scheduled TBs to determine which bundling parameter to use, the threshold values based on a number of uplink channel repetitions for the UE to transmit the bundled ACK feedback.

In some examples of the method, apparatuses, and non-transitory computer-readable medium described herein, transmitting the bundling indication may include operations, features, means, or instructions for transmitting an explicit indication of a bundling configuration.

In some examples of the method, apparatuses, and non-transitory computer-readable medium described herein, transmitting the bundling indication may include operations, features, means, or instructions for transmitting a set of possible bundling configurations and DCI signals that correspond to at least one possible bundling configuration.

In some examples of the method, apparatuses, and non-transitory computer-readable medium described herein, transmitting the bundling indication may include operations, features, means, or instructions for transmitting an indication of a number of uplink channel resources that can be used for the UE to transmit the bundled ACK feedback.

In some examples of the method, apparatuses, and non-transitory computer-readable medium described herein, the number of uplink channel resources may be based on the number of TBs scheduled.

In some examples of the method, apparatuses, and non-transitory computer-readable medium described herein, transmitting the bundling indication may include operations, features, means, or instructions for transmitting an indication of a number of scheduled TBs based on a bitmap field, a HARQ identification parameter, or a combination thereof, that may be included in a DCI indication.

In some examples of the method, apparatuses, and non-transitory computer-readable medium described herein, transmitting the bundling indication may include operations, features, means, or instructions for transmitting an ACK delay value.

In some examples of the method, apparatuses, and non-transitory computer-readable medium described herein, transmitting the bundling indication may include operations, features, means, or instructions for transmitting, in a DCI indication, an explicit indication of the bundling configuration from a set of possible bundling configurations.

In some examples of the method, apparatuses, and non-transitory computer-readable medium described herein, the explicit indication of the bundling configuration may be based on a number of scheduled TBs.

In some examples of the method, apparatuses, and non-transitory computer-readable medium described herein, the explicit indication of the bundling configuration may be jointly encoded with one or more identifiers associated with a HARQ bitmap to provide valid, non-redundant combinations of HARQ bitmaps and bundling configurations.

In some examples of the method, apparatuses, and non-transitory computer-readable medium described herein, the bundling indication may be transmitted via RRC signaling, a DCI indication, or a combination thereof.

In some examples of the method, apparatuses, and non-transitory computer-readable medium described herein, the bundled ACK feedback may be received at resource locations based on resource and time constraints including a gap for the UE to decode a downlink channel between the UE receiving the downlink channel and the UE transmitting the bundled ACK feedback, the ACK feedback for each TB not overlapping in time, a half-duplex capability of the UE, a full duplex capability of the UE, or a combination thereof.

In some examples of the method, apparatuses, and non-transitory computer-readable medium described herein, the bundled ACK feedback may be received at a starting location based on an ACK scheduling delay field transmitted in the DCI message, a number of subframes for the bundled ACK feedback, a number of downlink transmission subframes based on a repetition number field and resource assignment field, a minimum time interval between an end of the set of TBs and a start of the bundled ACK feedback, or a combination thereof.

In some examples of the method, apparatuses, and non-transitory computer-readable medium described herein, the bundled ACK feedback may be received at a starting location based on an ACK scheduling delay field transmitted in the DCI message, a number of subframes for the bundled ACK feedback, a granularity of interleaving indicating a number of repetitions of a downlink channel used as a base unit for inter-TB interleaving, a minimum time interval between an end of the set of TBs and a start of the bundled ACK feedback, or a combination thereof.

In some examples of the method, apparatuses, and non-transitory computer-readable medium described herein, the bundled ACK feedback may be received at resource locations based on a maximum number of TBs that can be scheduled by a single DCI message, a number of scheduled TBs, a bundling parameter indicating a maximum size of a TB group for the groups of TBs, a threshold value on the number of scheduled TBs to determine which bundling parameter to use, a number of uplink channel resources that can be used for transmitting the bundled ACK feedback, an ACK delay value, or a combination thereof.

In some examples of the method, apparatuses, and non-transitory computer-readable medium described herein, the bundled ACK feedback may be received at resource locations based on a bundling enable signal or a bundling disable signal.

In some examples of the method, apparatuses, and non-transitory computer-readable medium described herein, the bundled ACK feedback may be received at resource locations based on whether interleaving of TB repetition may be enabled, a granularity for inter-TB interleaving, an interleaving pattern used, a number of uplink channel repetitions configured for the bundled ACK feedback, or a combination thereof.

In some examples of the method, apparatuses, and non-transitory computer-readable medium described herein, a number of TBs in each TB group may be less than the total number of TBs in the set of TBs, and the sum of the TBs from each TB group may be equal to the total number of TBs in the set of TBs.

DETAILED DESCRIPTION

In some wireless communications systems, a base station may use multiple transport blocks (TBs) to transmit downlink signals to a user equipment (UE). For example, the base station may transmit one or more downlink control information (DCI) messages scheduling multiple TBs for the UE to receive. In some cases, the UE may be expected to transmit acknowledgment (ACK) feedback to the base station to indicate whether the TBs are successfully received and decoded (e.g., the base station may attempt to retransmit any TBs not successfully received/decoded by the UE). Rather than transmitting individual ACK feedback messages for each received TB, the UE may bundle one or more TBs into separate groups, where the UE transmits an individual bundled ACK feedback message for each group of TBs. Conventionally, a UE may bundle the ACK feedback for the TBs based on delaying respective ACK feedback for different TBs such that the ACK feedback aligns for multiple TBs, and the UE may transmit a single ACK feedback for the multiple TBs based on these respective delay fields for each TB. However, when multiple TBs are scheduled by a single DCI, the processing and signaling needed to use the delay fields may be inefficient and expensive (e.g., delay fields need to be indicated and configured for each scheduled TB).

As described herein, a UE may identify a bundling configuration for grouping multiple TBs scheduled by a single DCI into separate groups of TBs (e.g., TB bundles) such that separate ACK feedback messages are transmitted by the UE for each group of TBs. In some cases, the UE may determine the bundling configuration based on radio resource control (RRC) signaling from the base station, DCI signaling from the base station, relationships/equations/tables defined for the UE, or a combination thereof. Additionally, the UE may determine resource locations and timelines (e.g., instances in time) for transmitting the separate ACK feedback messages (e.g., bundled ACK feedback). For example, the resource locations and timelines for the ACK feedback messages may be determined based on RRC/DCI parameters signaled by the base station, interleaving parameters, processing and decoding gaps, numbers of downlink and uplink channel repetitions (e.g., for the TBs and ACK feedback messages, respectively), scheduling delay fields, the bundling configuration, and additional parameters.

Aspects of the disclosure are initially described in the context of a wireless communications system. Additionally, aspects of the disclosure are illustrated through an additional wireless communications system, a bundling configuration timeline, examples of ACK feedback timelines (e.g., with and without interleaving), and a process flow. Aspects of the disclosure are further illustrated by and described with reference to apparatus diagrams, system diagrams, and flowcharts that relate to bundling and timeline determination for multiple TBs scheduled by a single DCI message.

Figure 1:
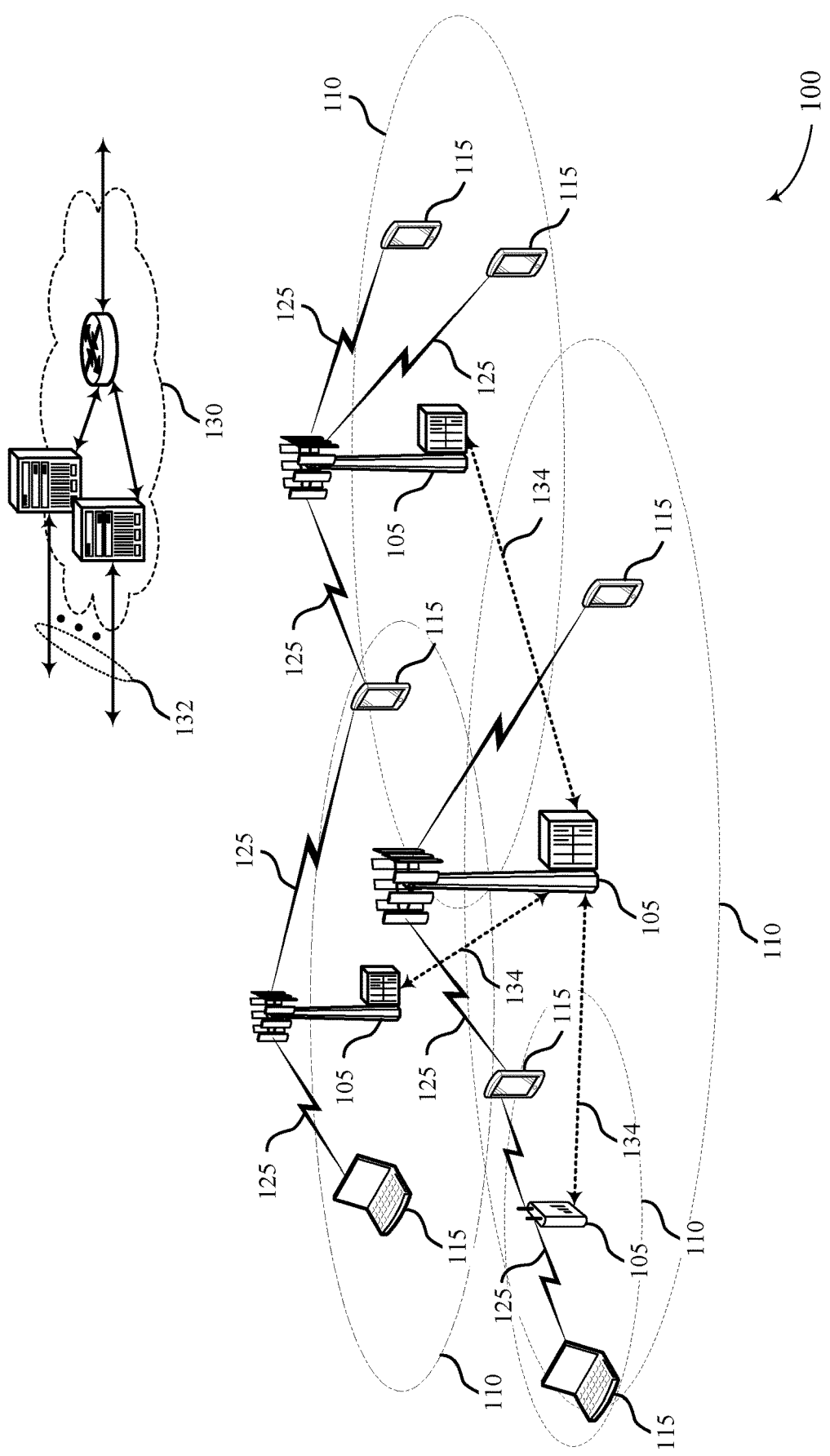
FIG. 1 illustrates an example of a system for wireless communications that supports bundling and timeline determination for multiple transport blocks (TBs) scheduled by a single downlink control information (DCI) message in accordance with aspects of the present disclosure.

FIG. 1 illustrates an example of a wireless communications system 100 that supports bundling and timeline determination for multiple TBs scheduled by a single DCI message in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier (ID) for distinguishing neighboring cells (e.g., a physical cell ID (PCID), a virtual cell ID (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, multiple TBs may be scheduled by a single DCI. Additionally, based on the multiple TBs transmitted (e.g., in the single DCI, in a multi-TB physical downlink shared channel (PDSCH)), HARQ ACK bundling may be used for the TBs to reduce uplink signaling overhead (e.g., over a physical uplink control channel (PUCCH)). In conventional systems (e.g., legacy enhanced machine-type communications (eMTC)), the HARQ ACK bundling may include which processes (e.g., TBs) to bundle and where to transmit a bundled ACK in a transmission timeline for the bundled processes. Additionally, the HARQ ACK bundling may be specified for each TB in a respective unique DCI via a delay field in the DCI (e.g., a "delay to ACK transmission" field).

For example, a base station 105 may transmit eight (8) TBs sequentially with a single repetition for each TB. Accordingly, for a bundle size of two (2) TBs per bundle (e.g., group of TBs) and assuming one (1) PUCCH repetition for each ACK bundle, a bundling configuration and delay field indication would result in a first bundle (e.g., bundle 1) that includes the first TB (e.g., TB1) with a signaled delay of eight (8) slots and the second TB (e.g., TB2) with a signaled delay of seven (7) slots, a second bundle (e.g., bundle 2) that includes the third TB (e.g., TB3) with a signaled delay of seven (7) slots and the fourth TB (e.g., TB4) with a signaled delay of six (6) slots, a third bundle (e.g., bundle 3) that includes the fifth TB (e.g., TB5) with a signaled delay of six (6) slots and the sixth TB (e.g., TB6) with a signaled delay of five (5) slots, and a fourth bundle (e.g., bundle 4) that includes the seventh TB (e.g., TB7) with a signaled delay of five (5) slots and the eight TB (e.g., TB8) with a signaled delay of four (4) slots. As described, each TB in a corresponding TB bundle may correspond to a same ACK feedback transmission based on the signaled delays since a previously occurring TB has a delay one slot longer than the next occurring TB. For example, the first TB includes a delay of eight (8) slots before the UE 115 transmits an ACK for the first TB, and the second TB that occurs one slot later than the first TB has a delay of one slot less than the first TB (e.g., seven (7) slots) before the UE 115 transmits an ACK for the second TB, resulting in both ACKs being transmitted together in an ACK bundle. Additionally, although the delays between receiving the TBs and transmitting the ACKs are described in slots above, the bundling configuration may include different length TTIs for the delays.

A bundling configuration like the one described above may include an "n+4" subframe delay constraint from the transmission of a (bundle of) TB(s) to the corresponding ACK transmission (e.g., on a PUCCH) and any guard subframe requirements (e.g., guard periods for transitioning between reception and transmission or for between subframes). Accordingly, if the delay fields mentioned in the DCI satisfy these subframe delay constraints and guard subframe requirements, the bundling configuration may be acceptable. While the use of the delay fields enables bundling of TBs for transmitting fewer ACK feedback messages, the delay fields may become expensive with respect to signaling and processing resources when extended to multiple TBs scheduled by one DCI. That is, a delay field may need to be configured and signaled for every TB scheduled within the one DCI, resulting in higher signaling overhead. Additionally, interleaving TB repetitions across TBs may further increase complexity and signaling when trying to bundle TBs for transmitting fewer ACK feedback messages. For example, the UE may not be able to bundle a same TB that is transmitted more than once in an interleaving pattern with subsequent instances of that same TB using the simple delay fields.

Wireless communications system 100 may support efficient techniques for a UE 115 to bundle TBs scheduled by a single DCI together into multiple TB groups consisting of one or more TBs such that bundled ACK feedback messages can be transmitted for each TB group to a base station 105 that transmitted the TBs. In some cases, the UE 115 may identify a bundling configuration for bundling the TBs into the multiple TB groups, where the bundling configuration is identified based on RRC signaling received from the base station 105, DCI signaling received from the base station 105, relationships or equations or tables defined for the UE 115, or a combination thereof. Additionally, techniques are described that enable the UE 115 to determine resource locations and timelines (e.g., instances in time) for transmitting the bundled ACK feedback messages.

Figure 2:
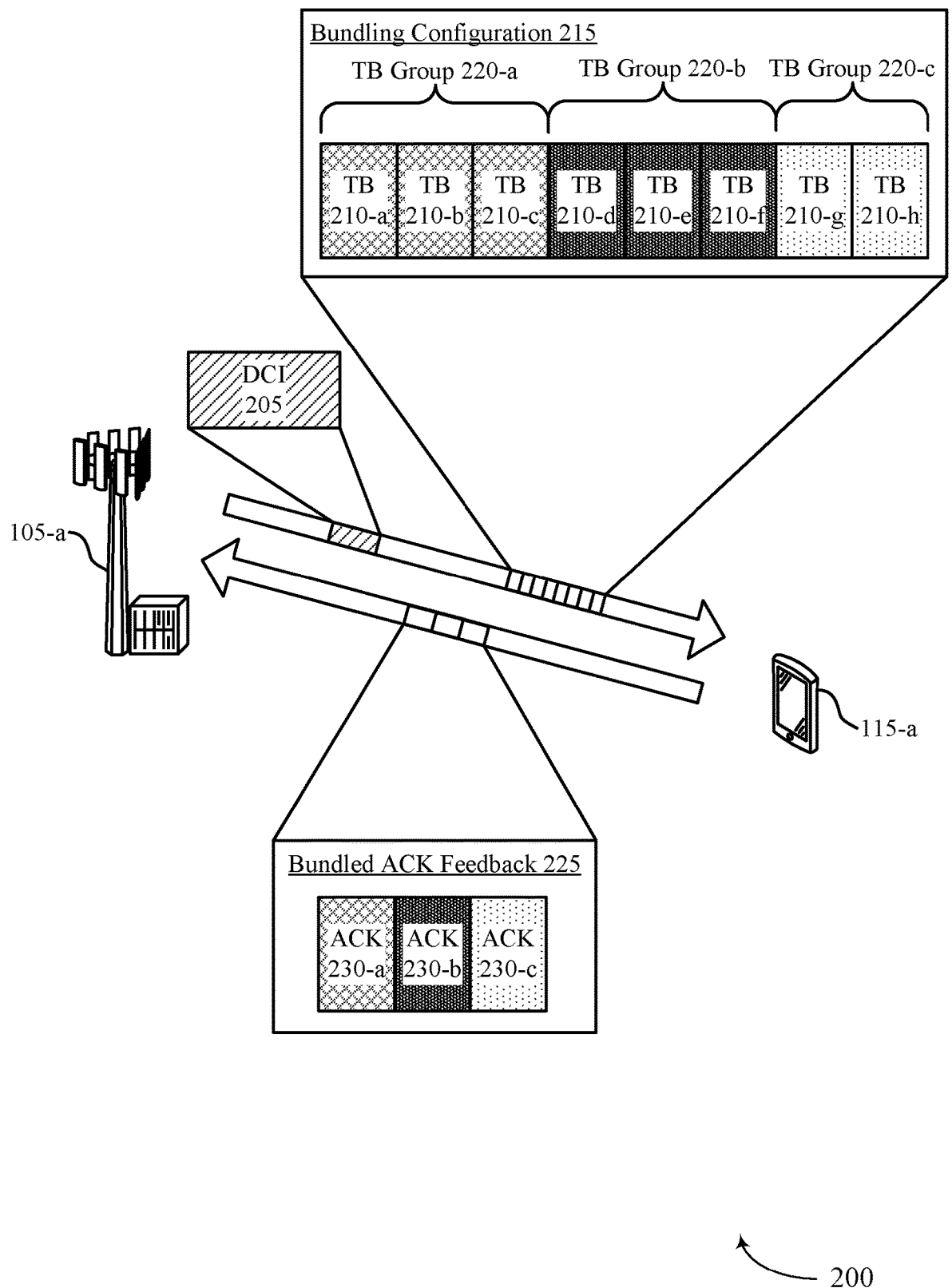
FIG. 2 illustrates an example of a wireless communications system that supports bundling and timeline determination for multiple TBs scheduled by a single DCI message in accordance with aspects of the present disclosure.

FIG. 2 illustrates an example of a wireless communications system 200 that supports bundling and timeline determination for multiple TBs scheduled by a single DCI message in accordance with aspects of the present disclosure. In some examples, wireless communications system 200 may implement aspects of wireless communications system 100. Wireless communications system 200 may include a base station 105-*a* and a UE 115-*a*, which may be examples of a corresponding base station 105 and a UE 115, respectively, as described with reference to FIG. 1. As described herein, base station 105-a may transmit a DCI 205 (e.g., single DCI) to UE 115-a, where DCI 205 schedules multiple TBs 210 to be subsequently transmitted to UE 115-a. Accordingly, UE 115-a may identify a bundling configuration 215 to form multiple TB groups 220 that enable UE 115-a to transmit bundled ACK feedback 225, where different ACKs 230 within bundled ACK feedback 225 correspond to respective TB groups 220. For example, UE 115-a may transmit a first ACK 230-a for a first TB group 220-a, a second ACK 230-b a second TB group 220-b, and a third ACK 230-c for a third TB group 220-c.

Bundling configuration 215 may include a way of splitting a group of N TBs 210 into bundles (e.g., TB groups 220) of certain sizes, such that the sum of the bundle sizes add up to N. For example, for N=8 (e.g., eight (8) TBs 210 scheduled by DCI 205), possible bundling configurations 215 may include a first TB group 220 of three (3) TBs 210, a second TB group 220 of three (3) TBs 210, and a third TB group 220 of two (2) TBs 210 (e.g., a (3,3,2) bundling configuration). Additionally or alternatively, bundling configuration 215 may include two (2) TB groups 220 of four TBs 210 each (e.g., a (4,4) bundling configuration), or four (4) TB groups 220 of two (2) TBs 210 each (e.g., a (2,2,2,2) bundling configuration), or an "unbundled" bundling configuration 215 that includes eight (8) TB groups 220 of one (1) TB 210 each (e.g., a (1,1,1,1,1,1,1,1) bundling configuration). In some cases, the bundling configuration 215 may also indicate that an order of the TBs 210 for the TB bundling or TB grouping follows an order of when the TBs 210 are transmitted to or received by UE 115-a. For example, as shown for N=8 and a bundling configuration of (3,3,2), a first TB 210-a (e.g., TB1), a second TB 210-b (e.g., TB2), a third TB 210-c (e.g., TB3) may be included in a first TB group 220-a (e.g., a first bundle); a fourth TB 210-d (e.g., TB4), a fifth TB 210-e (e.g., TB5), and a sixth TB 210-f (e.g., TB6) may be included in a second TB group 220-b (e.g., a second bundle); and a seventh TB 210-g (e.g., TB7) and an eighth TB 210-h (e.g., TB8) may be included in a third TB group 220-c (e.g., a third bundle).

Additionally, base station 105-a may indicate a parameter $N_{Max}$, where $N_{Max}$ denotes a maximum number of TBs 210 that can be scheduled by a single DCI 205. In some cases, $N_{Max}$ may be configured to UE 115-a (e.g., specified to UE 115-a), be RRC configured (e.g., signaled to UE 115-a via RRC signaling, pre-configured, etc.), or a combination thereof. For a configured or specified $N_{Max}$, an actual number of TBs 210 scheduled by a DCI 205 may range from one (1) through $N_{Max}$. Accordingly, the actual number of TBs 210 scheduled by DCI 205 may be denoted as $N_{sched}$.

In some cases, UE 115-a may determine (e.g., identify) bundling configuration 215 based in part on $N_{Max}$ and $N_{sched}$. Bundling configuration 215 may represent a HARQ-ACK bundling configuration that represents how to bundle HARQ-ACK feedback (e.g., bundled ACK feedback 225) from a set of scheduled TBs 210 (e.g., $N_{sched}$). As described herein, UE 115-a may interpret (e.g., identify, determine, etc.) bundling configuration 215 based on some combination of RRC signaling, DCI signaling, and a relationship (e.g., equation, table, etc.) specified to UE 115-a.

For example, base station 105-a may transmit one or more RRC signals (e.g., prior to transmitting the DCI 205) to assist UE 115-a in identifying bundling configuration 215 (e.g., the RRC signals are part of pre-configuration signaling to UE 115-a). In some cases, the RRC signaling may configure a single bundling parameter (B) (e.g., a first option), which may be interpreted as a largest possible bundling size that any bundling configuration may have (e.g., a maximum number of TBs 210 that can be bundled into a TB group 220). In some cases, UE 115-a may determine an exact bundling configuration from B, as well as other parameters in the DCI signaling, relationships, equations, or a combination thereof. For example, for an $N_{Max}$=8 (e.g., maximum of eight (8) TBs 210 can be scheduled by DCI 205) and a B=4 (e.g., B represents an RRC configured bundling parameter), UE 115-a may bundle the TBs 210 based on $N_{sched}$ while taking B into consideration as well. In some cases, for $N_{sched}$≤4, no HARQ ACK bundling may be configured. Additionally or alternatively, for $N_{sched}$>4, the bundling configurations may be determined by relationships/equations specified for UE 115-a. In some cases, for $N_{sched}$=8 and B=3, bundling configuration 215 may be interpreted as (3,3,2) where the TBs 210 scheduled by DCI 205 are bundled in the order with which the TBs 210 are transmitted or received as described above. Accordingly, the number of TB groups 220 with the maximum number of TBs of three (3) (e.g., number of (B=3)'s) may be determined by dividing $N_{sched}$ by B. In this example, two (2) TB groups 220 may include the maximum number of three (3) TBs, and a third TB group 220 may include the two (2) leftover TBs (e.g., $N_{sched}/B$=8/3=2 with a remainder of 2).

Additionally or alternatively, the RRC signaling (e.g., transmitted and received prior to the DCI 205) may configure multiple bundling parameters (B's) (e.g., a second option), each B corresponding to each $N_{sched}$. In some cases, the RRC signaling may configure one or more bundling parameter(s) (B's) and corresponding thresholds (T's) on $N_{sched}$ (e.g., a third option). Accordingly, any value of $N_{sched}$ above T may indicate a bundling configuration 215 for which the B would apply. For example, the RRC signaling may configure (B, T)=(4,4) for if a number of PUCCH repetitions is greater than one (1) (e.g., the ACKs 230 are transmitted multiple times for each TB group 220). Alternatively, the RRC signaling may configure (B, T)=(3,5) for when a number of PUCCH repetitions is equal to one (1). Accordingly, as an example, if $N_{sched}$=6 and the number of PUCCH repetitions equals one (1), UE 115-a may limit the number of TBs 210 per TB group 220 to three (3) TBs 210 (e.g., B=3 if $N_{sched}$>T, and $N_{sched}$=6 which is greater than T=5).

Additionally or alternatively, the RRC signaling (e.g., transmitted and received prior to the DCI 205) may configure bundling configurations 215 explicitly for relevant scenarios (e.g., a fourth option). For example, for each value of $N_{sched}$, a bundling configuration 215 may be explicitly signaled by RRC. In some cases, the RRC signaling may configure a set of possible bundling configurations 215, and a DCI signal (e.g., DCI 205 or a different DCI) may indicate which from among these possible bundling configurations 215 that UE 115-a is to use (e.g., a fifth option). Accordingly, joint encoding of a HARQ ID (e.g., to capture or indicate the $N_{sched}$) and the possible bundling configurations 215 may be employed to compress the DCI signal since smaller values of $N_{sched}$ may have fewer bundling configurations 215 feasible compared to higher values of $N_{sched}$. Additionally or alternatively, the RRC signaling may configure a number of PUCCH resources (P) that UE 115-a may use to transmit the bundled ACK feedback 225 for all TBs 210 (e.g., a sixth option). In some cases, P may be a per $N_{sched}$ configuration (e.g., P is based on $N_{sched}$, such that each $N_{sched}$ may correspond to a respective P value).

In addition to the RRC signaling, base station 105-a may transmit one or more DCI messages (e.g., after the RRC signaling) to assist UE 115-a with identifying a bundling configuration 215. For example, the value of $N_{sched}$ may be determined from a HARQ ID bitmap field or another related field related to a HARQ ID signaled in the DCI (e.g., DCI 205 or a separate DCI). Additionally or alternatively, base station 105-a may indicate a (single) HARQ ACK delay (D) in the DCI to be used in part by UE 115-a to determine the timeline of bundling configuration 215. For example, for some wireless systems (e.g., NB-IoT), where $N_{Max}=2$, the delay field, D, may exist in the DCI. Additionally, this delay field, D, may also be relevant for different wireless systems (e.g., eMTC) with $N_{Max}$ configured to two (2). Additionally or alternatively, when multiple bundling configurations 215 are possible, the DCI may signal an exact bundling configuration 215 from among the possible choices (e.g., similar to the process described in the fifth option for the RRC signaling). In some cases, the HARQ ID (e.g., indicating $N_{sched}$) may be jointly encoded with the signaled/indicated bundling configuration 215 to save DCI bits (e.g., larger HARQ bitmap weights, and thus larger $N_{sched}$ values, may have more bundling configurations possible).

Additionally, UE 115-a may use one or more relationships or equations specified to UE 115-a when identifying a bundling configuration 215 in addition to the RRC signaling and DCI signaling. For example, additionally or independently of the RRC and DCI parameters described above, UE 115-a may determine an exact bundling configuration 215 by means of relationships (e.g., equations, tables, etc.) defined for determining bundling configurations 215 for UE 115-a. For example, these relationship may be based on the RRC and DCI parameters described above (e.g., $N_{Max}$, $N_{sched}$, B, T, P, D), a bundling enable or disable signal sent in RRC/DCI, whether interleaving (in time) across TB repetition is enabled or disabled, a granularity (e.g., a minimum number of subframes taken together) for inter-TB interleaving, an exact interleaving pattern employed, a number of PUCCH repetitions configured for transmission of each ACK (bundle), or a combination thereof. Once UE 115-a identifies a bundling configuration 215 for forming TB groups 220 from the multiple scheduled TBs 210, UE 115-a may then determine resources to transmit the bundled ACK feedback 225 (e.g., and corresponding ACKs 230).

Figure 3:
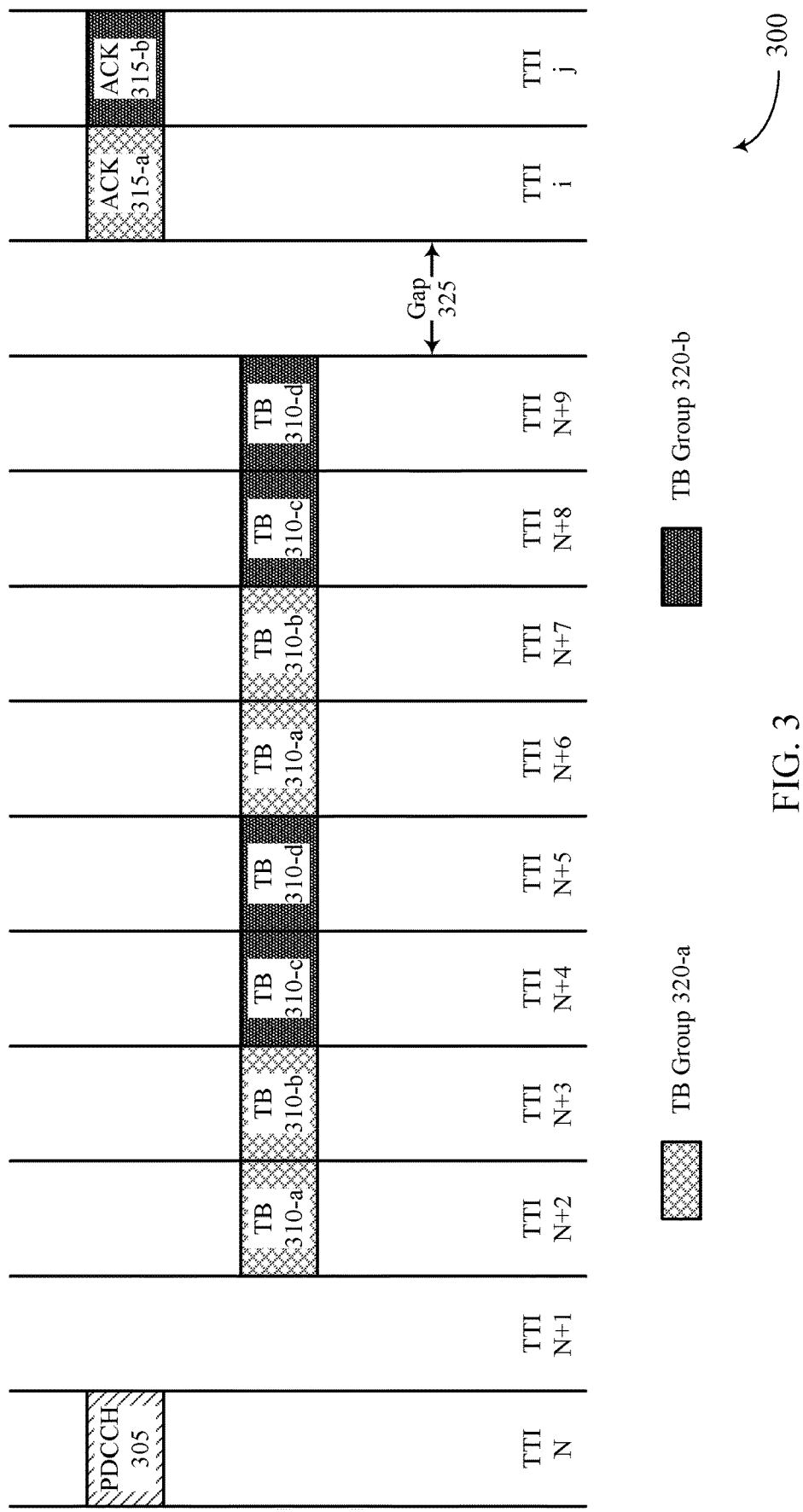
FIG. 3 illustrates an example of a bundling configuration timeline that supports bundling and timeline determination for multiple TBs scheduled by a single DCI message in accordance with aspects of the present disclosure.

FIG. 3 illustrates an example of a bundling configuration timeline 300 that supports bundling and timeline determination for multiple TBs scheduled by a single DCI message in accordance with aspects of the present disclosure. In some examples, bundling configuration timeline 300 may implement aspects of wireless communications systems 100 and 200. Bundling configuration timeline 300 may include techniques for a UE 115 to identify a bundling configuration as described with reference to FIG. 2 (e.g., based on RRC signaling; DCI signaling; relationships, tables, and equations specified to the UE 115; etc.). For example, the UE 115 may receive a physical downlink control channel (PDCCH) 305 (e.g., carrying a DCI) from a base station 105 that schedules multiple TBs 310, and the UE 115 may then group the TBs 310 into separate TB groups 320 based on the bundling configuration. Subsequently, the UE 115 may then transmit respective ACKs 315 (e.g., bundled ACK feedback) for each of the TB groups.

As shown, PDCCH 305 may schedule four (4) TBs 310, where the TBs 310 have a repetition of two (2) (e.g., a PDSCH repetition equal to two (2) such that each TB 310 is transmitted by the base station 105 twice). The bundling configuration identified by the UE 115 may include a first TB group 320-a that includes a first TB 310-a (e.g., TB1) and a second TB 310-b (e.g., TB2) and a second TB group 320-b that includes a third TB 310-c (e.g., TB3) and a fourth TB 310-d (e.g., TB4). Additionally, both repetitions of each TB 310 may be included in the same TB group 320. After determining the TB groups 320, the UE 115 may then transmit a first ACK 315-a corresponding to first TB group 320-a and a second ACK 315-b corresponding to second TB group 320-b. However, the UE 115 may first determine the resources (e.g., resource locations, timelines, instances in time, etc.) to transmit the ACKs 315.

In order to determine the resource for ACKs 315, the UE 115 may take into consideration multiple constraints. For example, the ACKs 315 may need a gap 325 (e.g., three (3) ms) to decode a PDSCH (e.g., the multiple TBs 310). That is, gap 325 may exist between a PDSCH and an acknowledgement containing the HARQ-ACK for the PDSCH to enable the UE 115 to fully decode the PDSCH. Accordingly, gap 325 may exist between a last received TB 310 (e.g., the second transmission of fourth TB 310-d) and first ACK 315-a. Additionally, another constraint may include that the HARQ-ACK cannot overlap in time. For example, to transmit a given PUCCH carrying HARQ-ACK, the previous PUCCH may need to be finished (e.g., for all repetitions if the PUCCH contains multiple repetitions). As shown, the UE 115 may finish transmitting first ACK 315-a before transmitting second ACK 315-b. Additionally, further constraints with respect to the transmitted PDSCH (e.g., complete set of PDSCH, all scheduled TBs 310, etc.) may be taken into consideration. For example, for a half-duplex UE 115 (e.g., using half duplex FDD (HD-FDD)), a gap of one (1) ms between the end of the PDSCH transmissions and the beginning of the HARQ-ACK transmissions may exist (e.g., to allow the half-duplex UE 115 to switch from a reception mode to a transmission mode). This gap for the half-duplex UE 115 may be included as part of gap 325 or in addition to gap 325. Alternatively, for TDD and a full duplex FDD (FD-FDD), simultaneous HARQ-ACK transmission and PDSCH reception may occur such that no gap is needed in between the end of the PDSCH reception and the HARQ-ACK transmission. In some cases, the PDSCH reception and HARQ-ACK transmission may be assumed to be consecutive rather than simultaneous even for TDD and FD-FDD scenarios.

As shown in the example of FIG. 3, first ACK 315-a may be transmitted in a TTI i, and second ACK 315-b may be transmitted in a TTI j. Accordingly, TTIs i and j may be located at resource locations and instances in times based on the constraints described above. For example, TTI i may be located at a TTI greater than or equal to the last occurring TB 310 for first TB group 320-a (e.g., second repetition of second TB 310-b at TTI N+7) plus four (4) ms for the PDSCH processing constraint (e.g., i≥(N+7)+4). Similarly, TTI j may be located at a TTI greater than or equal to the last occurring TB 310 for second TB group 320-b (e.g., second repetition of fourth TB 310-d at TTI N+9) plus four (4) ms for the PDSCH processing constraint (e.g., j≥(N+9)+4). Additionally, for the constraint that no two ACKs 315 can overlap, TTI j may have a further constraint such that TTI j occurs greater than or equal to TTI i plus a number of repetitions (e.g., PUCCH repetitions) for the ACKs 315 (e.g., j≥i+R, where R represents the number of repetitions for PUCCH). Additionally, for the last constraint described above (e.g., further constraints with respect to the transmitted PDSCH), if the UE 115 is a half-duplex UE 115 operating in FDD (e.g., HD-FDD), the TTIs may be defined such that TTI j is greater than (e.g., comes after) TTI i and that TTI i is greater than the last TTI carrying a TB 310 (e.g., TTI N+9) plus one (1) ms to allow the half-duplex UE 115 to retune from a last subframe (e.g., j>i>(N+9)+1). The TTIs described with respect to FIG. 3 may span different lengths (e.g., subframes, slots, etc.).

In some cases, the satisfaction of the constraints described above may depend on the RRC/DCI parameters described above with reference to FIG. 2 (e.g., $N_{Max}$, $N_{sched}$, B, T, P, D), a bundling enable or disable signal sent in RRC or DCI, the bundling configuration and bundling sizes determined, whether interleaving (e.g., in time) across TB repetition is enabled or disabled, a granularity (e.g., minimum number of subframes taken together) for inter-TB interleaving, an exact interleaving pattern employed, a number of PDSCH repetitions configured for multiple TB transmission (e.g., number of repetitions for the TBs 310), a number of PUCCH repetitions configured for transmission of each ACK 315 (bundle), or a combination thereof.

Figure 4A:
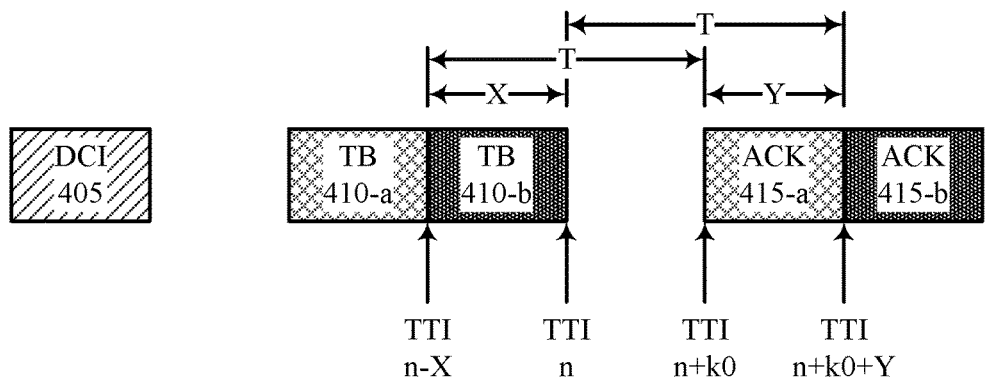
FIGS. 4A, 4B, and 4C illustrate examples of acknowledgment (ACK) feedback timelines that support bundling and timeline determination for multiple TBs scheduled by a single DCI message in accordance with aspects of the present disclosure.
Figure 4B:
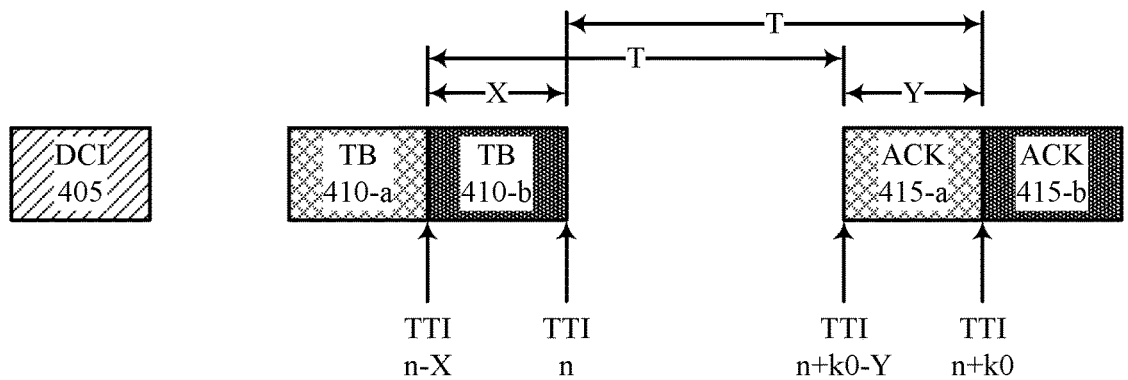
Figure 4C:
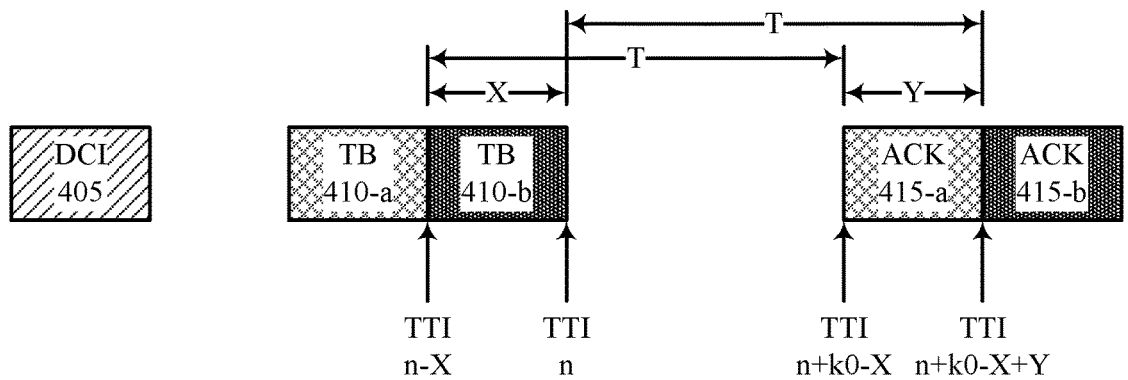

FIGS. 4A, 4B, and 4C illustrate examples of ACK feedback timelines 400, 401, and 402, respectively, that support bundling and timeline determination for multiple TBs scheduled by a single DCI message in accordance with aspects of the present disclosure. In some examples, ACK feedback timelines 400, 401, and 402 may implement aspects of wireless communications systems 100 and 200. A UE 115 may use ACK feedback timeline 400, 401, or 402 for transmitting one or more ACKs 415 for groups of TBs arranged based on a bundling configuration. For example, the UE 115 may receive a DCI 405 that schedules multiple TBs 410 to be received at the UE 115. After receiving the TBs 410 and bundling them based on the bundling configuration, the UE 115 may then transmit respective ACKs 415 for the groups of TBs 410. As shown, DCI 405 may schedule a first TB 410-a and a second TB 410-b, where first TB 410-a constitutes a first TB group and second TB 410-b constitutes a second TB group based on the bundling configuration. The UE 115 may then transmit a first ACK 415-a for first TB 410-a and a second ACK 415-b for second TB 410-b. In some cases, ACK feedback timeline 400, 401, and 402 may include a $N_{Max}=2$, indicating that a maximum of two (2) TBs 410 can be scheduled by DCI 405.

For some wireless systems (e.g., NB-IoT), in case of non-interleaved transmissions (e.g., no repetitions of TBs 410 for the TBs 410 to alternate in time) and for a case of individual feedback of two (2) TBs, a continuous uplink feedback may start after the end of a n+k'$_0$−1 downlink subframe for FDD, where n is an ending subframe of a last scheduled TB (e.g., second TB 410-b) and k'$_0$ is down-selected from the following two choices: a same value as for a one TB 410 case; or a value that depends on the length of the last TB 410 and the ACK/NACK resources.

ACK feedback timeline 400, 401, and 402 may represent possible timelines that the UE 115 can use for two (2) TBs scheduled by a single DCI 405. Accordingly, the UE 115 may determine the starting location of the ACKs 415 based on different parameters. For example, without TB interleaving and for a bundling configuration (1,1) as shown, the UE 115 may transmit first ACK 415-a starting after the end of the n+k'$_0$−1 downlink subframe for FDD as described above. However, the UE 115 may select the value of k'$_0$ for determining the starting subframe of consecutive HARQ-ACK transmissions (e.g., first ACK 415-a and second ACK 415-b) from different options than described above. For example, the UE 115 may select k'$_0$ from a set of candidate values {$k_0$, $k_0$−X, $k_0$−Y}; or from a set of candidate values {1, 2, . . . , $k_0$}. For the above options, the UE 115 may determine $k_0$ by the HARQ-ACK scheduling delay field in DCI, Y may denote a number of subframes for HARQ-ACK transmission as configured by RRC (e.g., length of the ACKs 415), and X may represent a number of PDSCH transmission subframes based on a repetition number field and a resource assignment field in DCI (e.g., length of a TB 410).

In some cases, the UE 115 may base the down-selection of $k_0$ on the following two constraints: (n+k'$_0$)>(n−X+T) and (n+k'$_0$+Y)>(n+T), where T is a minimum time interval between the end of PDSCH and the start of the corresponding HARQ-ACK transmission. For example, T may represent the time between the end of first TB 410-a and the start of first ACK 415-a, as well as the time between the end of second TB 410-b and the start of second ACK 415-b. In some cases, T may either have a fixed value (e.g., eight (8) ms) or may be equal to a HARQ-ACK scheduling delay ($k_0$). If more than one candidate value meets the timing constraints, then the UE 115 may select a minimum value from the more than one candidate values for k'$_0$.

As shown in ACK feedback timeline 400, 401, and 402, TTI n may represent a last TTI of second TB 410-b (e.g., TB2) and TTI n−X may represent a last subframe of first TB 410-a (e.g., TB1). ACK feedback timeline 400 may represent a k'$_0$ down selected to be $k_0$, such that first ACK 415-a is transmitted at TTI n+$k_0$ and second ACK 415-b is transmitted at TTI n+$k_0$+Y. Additionally or alternatively, ACK feedback timeline 401 may represent a k'$_0$ down selected to be $k_0$−Y, such that first ACK 415-a is transmitted at TTI n+$k_0$−Y and second ACK 415-b is transmitted at TTI n+$k_0$. Additionally or alternatively, ACK feedback timeline 402 may represent a k'$_0$ down selected to be $k_0$−X, such that first ACK 415-a is transmitted at TTI n+$k_0$−X and second ACK 415-b is transmitted at TTI n+$k_0$−X+Y. The TTIs described with respect to FIGS. 4A, 4B, and 4C may span different lengths (e.g., subframes, slots, etc.).

Figure 5:
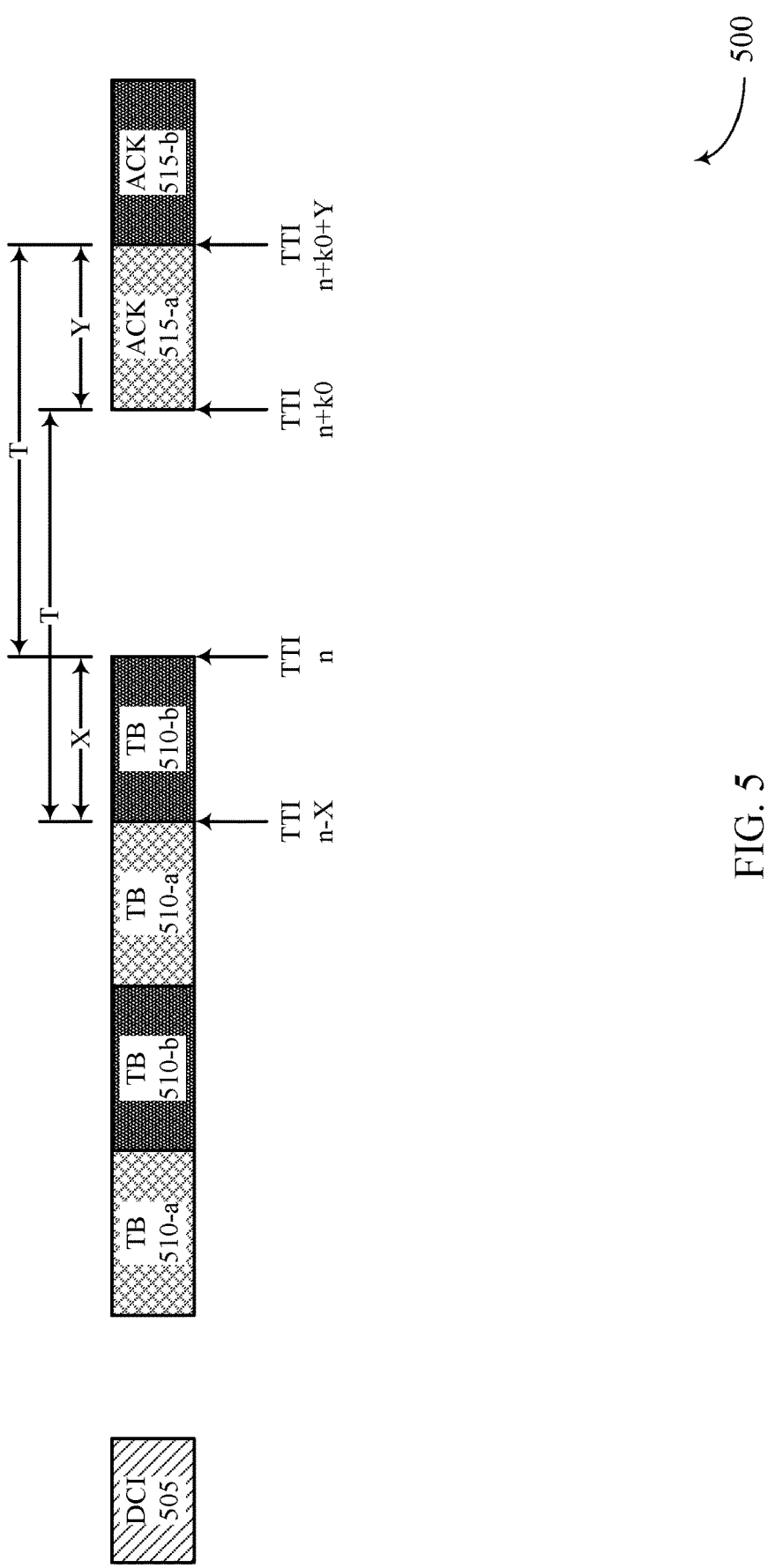
FIG. 5 illustrates an example of an interleaving ACK feedback timeline that supports bundling and timeline determination for multiple TBs scheduled by a single DCI message in accordance with aspects of the present disclosure.

FIG. 5 illustrates an example of a interleaving ACK feedback timeline 500 that supports bundling and timeline determination for multiple TBs scheduled by a single DCI message in accordance with aspects of the present disclosure. In some examples, interleaving ACK feedback timeline 500 may implement aspects of wireless communications systems 100 and 200. A UE 115 may use interleaving ACK feedback timeline 500 for transmitting one or more ACKs 515 for groups of TBs arranged based on a bundling configuration. For example, the UE 115 may receive a DCI 505 that schedules multiple TBs 510 to be received at the UE 115. After receiving the TBs 510 and bundling them based on the bundling configuration, the UE 115 may then transmit respective ACKs 515 for the groups of TBs 510. As shown, DCI 505 may schedule two repetitions of a first TB 510-a and two repetitions of a second TB 510-b, where the first repetition and the second repetition of TB 510-a constitute a first TB group and the first repetition and the second repetition of second TB 510-b constitute a second TB group based on the bundling configuration. The UE 115 may then transmit a first ACK 515-a for first TB 510-a and a second ACK 515-b for second TB 510-b. In some cases, interleaving ACK feedback timeline 500 may include a $N_{Max}=2$, indicating that a maximum of two (2) TBs 510 (e.g., two (2) TB groups) can be scheduled by DCI 505.

As shown, the repetitions of each TB 510 may be arranged based on an interleaving pattern, where the first TB 510-a and the second TB 510-b alternate in time. In some cases, the UE 115 may use interleaving ACK feedback timeline 500 for situations where $N_{Max}=2$ and for different wireless systems (e.g., NB-IoT, eMTC, etc.). Additionally, the UE 115 may use interleaving ACK feedback timeline 500 for scenarios with interleaving and for a bundling configuration (1,1) as shown. Similar to the ACK feedback timelines 400, 401, and 402 as described above with reference to FIG. 4, first ACK 515-a may be transmitted starting after the end of the n+k'$_0$−1 downlink subframe for FDD, where the value of k'$_0$ may be selected from a set of candidate values {k$_0$, k$_0$−X, k$_0$−Y} or from a set of candidate values {1, 2, . . . , k$_0$}. However, X may represent a different parameter. For example, with interleaving enabled, X may represent a "granularity of interleaving." That is, X may represent a number of repetitions of PDSCH that is used as the base unit of inter-TB interleaving.

All other parameter definitions and constraints as described above for ACK feedback timelines 400, 401, and 402 remain valid. For example, as shown, interleaving ACK feedback timeline 500 may represent a k'$_0$ down selected to be k$_0$, such that first ACK 515-a is transmitted at TTI n+k$_0$ and second ACK 515-b is transmitted at TTI n+k$_0$+Y. Additionally, although not shown, k'$_0$ may be down selected to be k$_0$−X or k$_0$−Y, with first ACK 515-a and second ACK 515-b transmitted at corresponding TTIs. The TTIs described with respect to FIG. 5 may span different lengths (e.g., subframes, slots, etc.).

In some cases, the UE 115 may determine a PUCCH resource location for a certain bundle of TBs (e.g., for a given timeline) based on one or more parameters including the RRC and DCI parameters described above with reference to FIG. 2 (e.g., N$_{Max}$, N$_{sched}$, B, T, P, D), a bundling enable or disable signal sent in RRC or DCI, whether interleaving (e.g., in time) across TB repetition is enabled or disabled, a granularity (e.g., minimum number of subframes taken together) for inter-TB interleaving, an exact interleaving pattern employed, a number of PUCCH repetitions configured for transmission of each ACK (bundle), or a combination thereof. Additionally or alternatively, the PUCCH resource location for transmitting ACKs 515 may be determined by a parameter $$n_{PUCCH}^{(1, \tilde{p}_0)}.$$

To distinguish PUCCH resources for UEs 115 configured with multi-TB scheduling with a single DCI, $$n_{PUCCH}^{(1, \tilde{p}_0)}$$

for these UEs 115 may have a dependence on (e.g., as an additive offset corresponding to) any of the parameters mentioned above.

Figure 6:
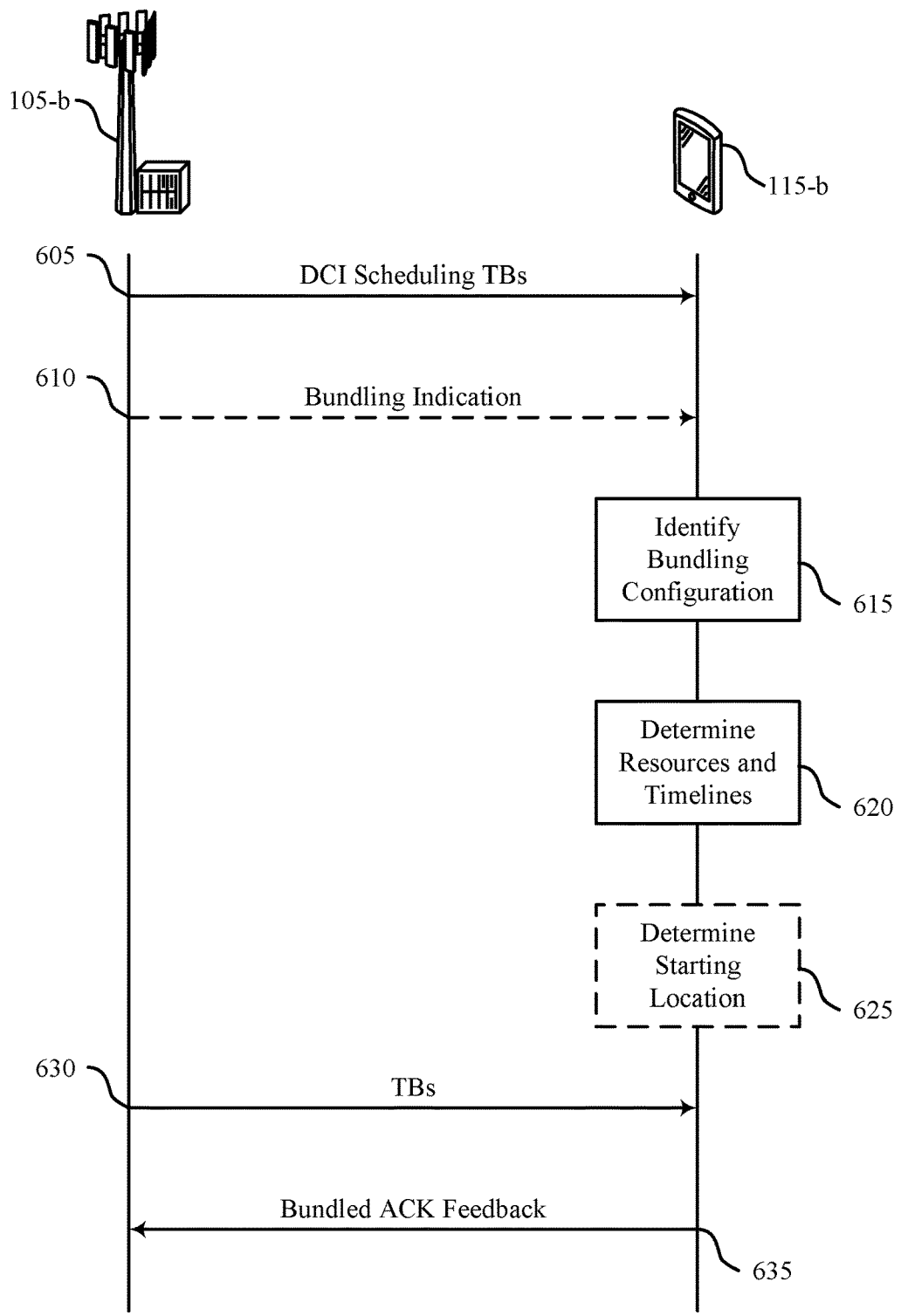
FIG. 6 illustrates an example of a process flow that supports bundling and timeline determination for multiple TBs scheduled by a single DCI message in accordance with aspects of the present disclosure.

FIG. 6 illustrates an example of a process flow 600 that supports bundling and timeline determination for multiple TBs scheduled by a single DCI message in accordance with aspects of the present disclosure. In some examples, process flow 600 may implement aspects of wireless communications systems 100 and 200. Process flow 600 may include a base station 105-b and a UE 115-b, which may be examples of a corresponding base station 105 and a UE 115, respectively, as described with reference to FIGS. 1-5.

In the following description of the process flow 600, the operations between UE 115-b and base station 105-b may be transmitted in a different order than the order shown, or the operations performed by base station 105-b and UE 115-b may be performed in different orders or at different times. Certain operations may also be left out of the process flow 600, or other operations may be added to the process flow 600. It is to be understood that while base station 105-b and UE 115-b are shown performing a number of the operations of process flow 600, any wireless device may perform the operations shown.

At 605, UE 115-b may receive a DCI message scheduling UE 115-b to receive a set of TBs.

At 610, base station 105-b may transmit, to UE 115-b, a bundling indication to enable UE 115-b to group individual ones of the set of TBs into groups and for UE 115-b to transmit bundled ACK feedback for each of the groups of TBs.

At 615, UE 115-b may identify a bundling configuration for grouping individual ones of the set of TBs into groups and for reporting bundled ACK feedback for each of the groups of TBs. For example, a number of TBs in each group of TBs may be less than the total number of TBs in the set of TBs, and the sum of the TBs from each group of TBs may be equal to the total number of TBs in the set of TBs. In some cases, UE 115-b may receive a bundling indication via RRC signaling (e.g., pre-configured, signaled before the DCI message received at 605, etc.), a DCI indication, or a combination thereof (e.g., received at 610). For example, UE 115-b may identify the bundling configuration based on receiving a bundling parameter (e.g., B) indicating a maximum size of a TB group for the groups of TBs; receiving multiple bundling parameters (e.g., B's) indicating maximum sizes of TB groups for different numbers of scheduled TBs (e.g., N$_{sched}$); receiving multiple bundling parameters indicating maximum sizes of TB groups for different numbers of scheduled TBs and threshold values (e.g., T) on the number of scheduled TBs to determine which bundling parameter to use, the threshold values based on a number of uplink channel repetitions for transmitting the bundled ACK feedback; receiving an explicit indication of the bundling configuration; receiving a set of possible bundling configurations and DCI signals that correspond to at least one possible bundling configuration; receiving an indication of a number of uplink channel resources (e.g., P) that can be used for transmitting the bundled ACK feedback (e.g., the number of uplink channel resources may be based on the number of TBs scheduled); or a combination thereof (e.g., RRC signaling).

Additionally or alternatively, UE 115-b may identify the bundling configuration based on determining a number of scheduled TBs based on a bitmap field, HARQ identification (e.g., HARQ ID) parameter, or a combination thereof, that is included in a DCI indication; receiving an ACK delay value; receiving, in a DCI indication, an explicit indication of the bundling configuration from a set of possible bundling configurations, where the explicit indication of the bundling configuration is jointly encoded with one or more IDs associated with a HARQ bitmap to provide valid, non-redundant combinations of HARQ bitmaps and bundling configurations; or a combination thereof (e.g., DCI signaling).

In some cases, UE 115-b may identify the bundling configuration based on determining a bundling indication based on a bundling relationship defined for UE 115-b. For example, the bundling relationship may include a relationship between a maximum number of TBs that can be scheduled by a single DCI message (e.g., N$_{Max}$), a number of scheduled TBs (e.g. N$_{sched}$), a bundling parameter indicating a maximum size of a TB group for the groups of TBs (e.g., B), a threshold value on the number of scheduled TBs to determine which bundling parameter to use (e.g., T), a number of uplink channel resources that can be used for transmitting the ACK feedback (e.g., P), an ACK delay value (e.g., D), a bundling enable signal, a bundling disable signal, whether interleaving of TB repetitions is enabled, a granularity for inter-TB interleaving, an interleaving pattern used, a number of uplink channel repetitions configured for the ACK feedback, or a combination thereof.

At 620, UE 115-*b* may determine resource locations and instances in time for transmitting the bundled ACK feedback for each of the groups of TBs. In some cases, UE 115-*b* may determine the resource locations and instances in time based on a satisfaction of one or more resource and time constraints, where the one or more resource and time constraints include a minimum gap for decoding a downlink channel between receipt of the downlink channel and transmission of the bundled ACK feedback, that the bundled ACK feedback for each TB does not overlap in time, a half-duplex capability of UE 115-*b*, a full duplex capability of UE 115-*b*, or a combination thereof. Additionally, the satisfaction of the one or more resource and time constraints may be based on a maximum number of TBs that can be scheduled by a single DCI message (e.g., $N_{Max}$), a number of scheduled TBs (e.g., $N_{sched}$), a bundling parameter indicating a maximum size of a TB group for the groups of TBs (e.g., B), a threshold value on the number of scheduled TBs to determine which bundling parameter to use (e.g., T), a number of uplink channel resources that can be used for transmitting the ACK feedback (e.g., P), an ACK delay value (e.g., D), a bundling enable signal, a bundling disable signal, the identified bundling configuration, whether interleaving of TB repetitions is enabled, a granularity for inter-TB interleaving, an interleaving pattern used, a number of uplink channel repetitions configured for the ACK feedback, or a combination thereof. In some cases, the one or more time constraints may include at least a first constraint type and a second constraint type, and the instances in time may be determined based on a simultaneous satisfaction of the first constraint type and the second constraint type.

At 625, UE 115-*b* may determine a starting location of the resource locations and the instances in time for transmitting the bundled ACK feedback based on an ACK scheduling delay field received in the DCI message, a number of subframes for the bundled ACK feedback, a number of downlink transmission subframes based on a repetition number field and resource assignment field, a minimum time interval between an end of the set of TBs and a start of the bundled ACK feedback, or a combination thereof. In some cases, the minimum time interval between the end of the set of TBs and the start of the bundled ACK feedback may be fixed, equal to ACK scheduling delay field, or a combination thereof. Additionally or alternatively, UE 115-*b* may determine the starting location of the resource locations and the instances in time for transmitting the bundled ACK feedback based on an ACK scheduling delay field received in the DCI message, a number of subframes for the bundled ACK feedback, a granularity of interleaving indicating a number of repetitions of a downlink channel used as a base unit for inter-TB interleaving, a minimum time interval between an end of the set of TBs and a start of the bundled ACK feedback, or a combination thereof.

In some cases, UE 115-*b* may determine a first starting location for transmitting a first bundled ACK feedback for a first group of TBs of the set of TBs, where the first starting location is based on a first constraint type. For example, the first constraint type may include a first minimum time interval between an end of the first group of TBs and a start of the first bundled ACK feedback, a second minimum interval between an end of a last TB of the set of TBs and the start of the first bundled ACK feedback, or a combination thereof. Additionally, UE 115-*b* may determine a second starting location for transmitting one or more additional bundled ACK feedbacks for remaining groups of TBs after the first group of TBs, where the second starting location is based on a second constraint type. For example, the second constraint type may include a third minimum time interval between an end of a corresponding group of TBs from the remaining groups of TBs and a start of one of the additional bundled ACK feedbacks for the corresponding group of TBs, a fourth minimum time interval between an end of a previous bundled ACK feedback and the start of one of the additional bundled ACK feedbacks, the number of downlink transmission subframes based on the repetition number field and resource assignment field, or a combination thereof.

At 630, UE 115-*b* may receive the set of TBs.

At 635, UE 115-*b* may transmit the bundled ACK feedback for each of the groups of TBs based on the determined resource locations and instances in time.

Figure 7:
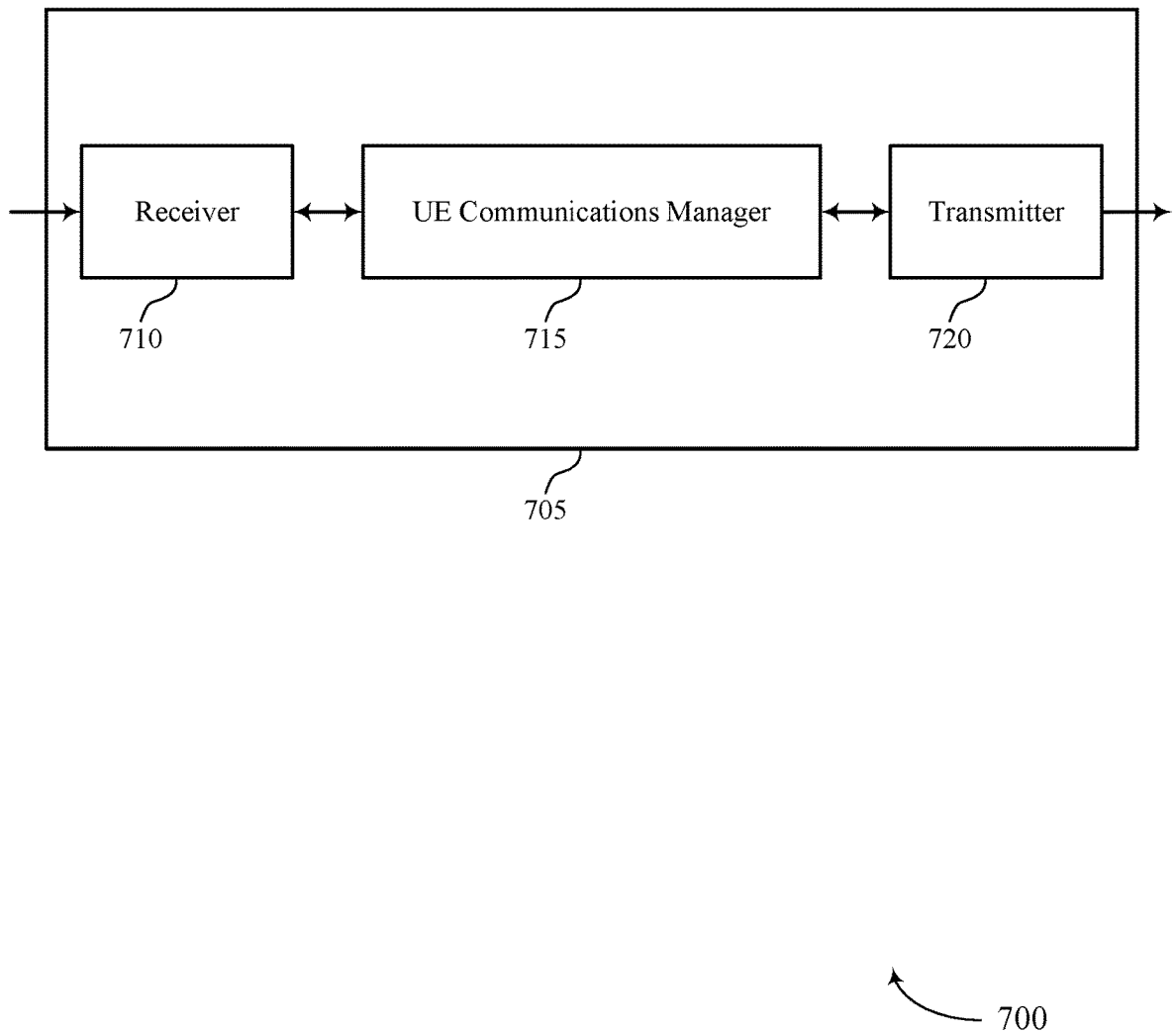
FIGS. 7 and 8 show block diagrams of devices that support bundling and timeline determination for multiple TBs scheduled by a single DCI message in accordance with aspects of the present disclosure.

FIG. 7 shows a block diagram 700 of a device 705 that supports bundling and timeline determination for multiple TBs scheduled by a single DCI message in accordance with aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to bundling and timeline determination for multiple TBs scheduled by a single DCI message, etc.). Information may be passed on to other components of the device 705. The receiver 710 may be an example of aspects of the transceiver 1020 described with reference to FIG. 10. The receiver 710 may utilize a single antenna or a set of antennas.

The UE communications manager 715 may receive a DCI message scheduling the UE to receive a set of TBs. In some cases, the UE communications manager 715 may identify a bundling configuration for grouping individual ones of the set of TBs into groups and for reporting bundled ACK feedback for each of the groups of TBs. Additionally, the UE communications manager 715 may determine resource locations and instances in time for transmitting the bundled ACK feedback for each of the groups of TBs. Accordingly, the UE communications manager 715 may receive the set of TBs. Subsequently, the UE communications manager 715 may transmit the bundled ACK feedback for each of the groups of TBs based on the determined resource locations and instances in time. The UE communications manager 715 may be an example of aspects of the UE communications manager 1010 described herein.

The UE communications manager 715, or its sub-components, may be implemented in hardware, code (e.g., software or firmware) executed by a processor, or any combination thereof. If implemented in code executed by a processor, the functions of the UE communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
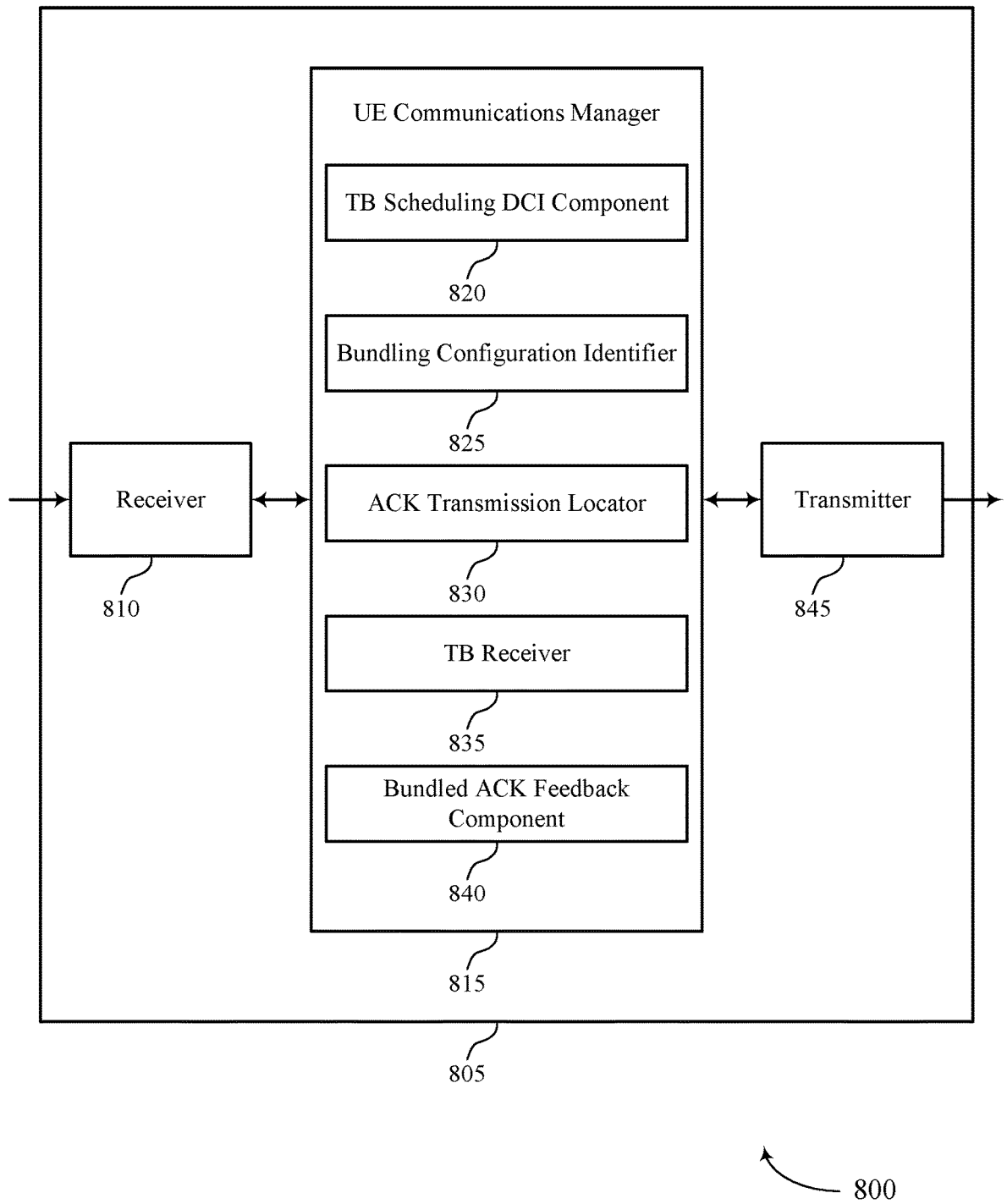

FIG. 8 shows a block diagram 800 of a device 805 that supports bundling and timeline determination for multiple TBs scheduled by a single DCI message in accordance with aspects of the present disclosure. The device 805 may be an example of aspects of a device 705, or a UE 115 as described herein. The device 805 may include a receiver 810, a UE communications manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to bundling and timeline determination for multiple TBs scheduled by a single DCI message, etc.). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may be an example of aspects of the UE communications manager 715 as described herein. The UE communications manager 815 may include a TB scheduling DCI component 820, a bundling configuration identifier 825, an ACK transmission locator 830, a TB receiver 835, and a bundled ACK feedback component 840. The UE communications manager 815 may be an example of aspects of the UE communications manager 1010 described herein.

The TB scheduling DCI component 820 may receive a DCI message scheduling the UE to receive a set of TBs.

The bundling configuration identifier 825 may identify a bundling configuration for grouping individual ones of the set of TBs into groups and for reporting bundled ACK feedback for each of the groups of TBs.

The ACK transmission locator 830 may determine resource locations and instances in time for transmitting the bundled ACK feedback for each of the groups of TBs.

The TB receiver 835 may receive the set of TBs.

The bundled ACK feedback component 840 may transmit the bundled ACK feedback for each of the groups of TBs based on the determined resource locations and instances in time.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
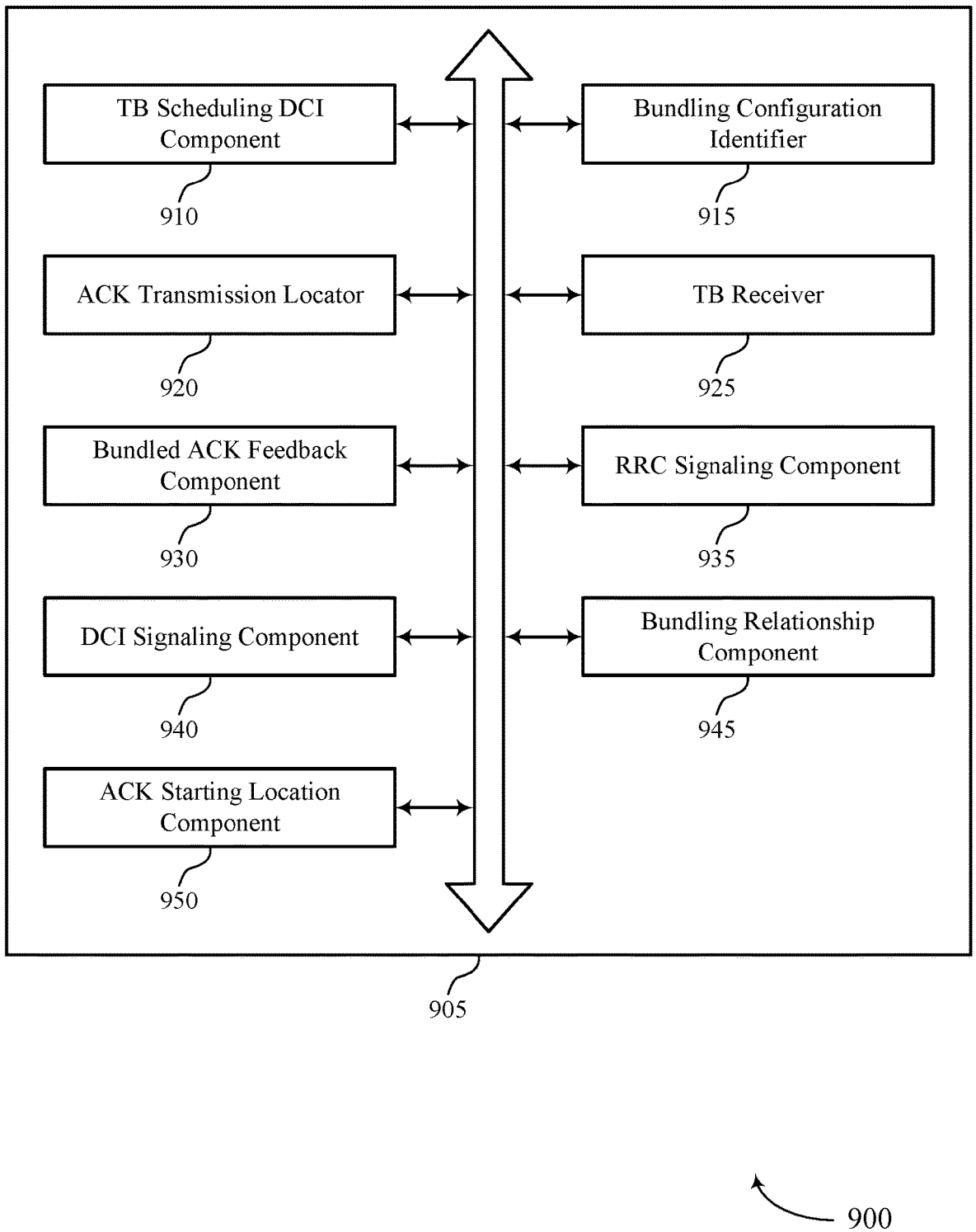
FIG. 9 shows a block diagram of a user equipment (UE) communications manager that supports bundling and timeline determination for multiple TBs scheduled by a single DCI message in accordance with aspects of the present disclosure.

FIG. 9 shows a block diagram 900 of a UE communications manager 905 that supports bundling and timeline determination for multiple TBs scheduled by a single DCI message in accordance with aspects of the present disclosure. The UE communications manager 905 may be an example of aspects of a UE communications manager 715, a UE communications manager 815, or a UE communications manager 1010 described herein. The UE communications manager 905 may include a TB scheduling DCI component 910, a bundling configuration identifier 915, an ACK transmission locator 920, a TB receiver 925, a bundled ACK feedback component 930, a RRC signaling component 935, a DCI signaling component 940, a bundling relationship component 945, and an ACK starting location component 950. Each of these modules may communicate, directly or indirectly, with one another (e.g., via one or more buses).

The TB scheduling DCI component 910 may receive a DCI message scheduling the UE to receive a set of TBs.

The bundling configuration identifier 915 may identify a bundling configuration for grouping individual ones of the set of TBs into groups and for reporting bundled ACK feedback for each of the groups of TBs. In some examples, the bundling configuration identifier 915 may receive a bundling indication via RRC signaling, a DCI indication, or a combination thereof. Additionally, a number of TBs in each group of TBs may be less than the total number of TBs in the set of TBs, and the sum of the TBs from each group of TBs may be equal to the total number of TBs in the set of TBs.

The ACK transmission locator 920 may determine resource locations and instances in time for transmitting the bundled ACK feedback for each of the groups of TBs. In some examples, the ACK transmission locator 920 may determine the resource locations and instances in time based on satisfaction of one or more resource and time constraints, where the one or more resource and time constraints include a minimum gap for decoding a downlink channel between receipt of the downlink channel and transmission of the bundled ACK feedback, that the bundled ACK feedback for each TB does not overlap in time, a half-duplex capability of the UE, a full duplex capability of the UE, or a combination thereof. Additionally, the one or more time constraints may include at least a first constraint type and a second constraint type, and the instances in time may be determined based on a simultaneous satisfaction of the first constraint type and the second constraint type.

In some examples, the satisfaction of the one or more resource and time constraints may be based on a maximum number of TBs that can be scheduled by a single DCI message, a number of scheduled TBs, a bundling parameter indicating a maximum size of a TB group for the groups of TBs, a threshold value on the number of scheduled TBs to determine which bundling parameter to use, a number of uplink channel resources that can be used for transmitting the ACK feedback, an ACK delay value, or a combination thereof. Additionally or alternatively, the satisfaction of the one or more resource and time constraints may be based on a bundling enable signal, a bundling disable signal, the identified bundling configuration, or a combination thereof. In some cases, the satisfaction of the one or more resource and time constraints may be based on whether interleaving of TB repetition is enabled, a granularity for inter-TB interleaving, an interleaving pattern used, a number of uplink channel repetitions configured for the ACK feedback, or a combination thereof.

The TB receiver 925 may receive the set of TBs.

The bundled ACK feedback component 930 may transmit the bundled ACK feedback for each of the groups of TBs based on the determined resource locations and instances in time.

The RRC signaling component 935 may receive a bundling parameter indicating a maximum size of a TB group for the groups of TBs; may receive multiple bundling parameters indicating maximum sizes of TB groups for different numbers of scheduled TBs; may receive multiple bundling parameters indicating maximum sizes of TB groups for different numbers of scheduled TBs and threshold values on the number of scheduled TBs to determine which bundling parameter to use, the threshold values based on a number of uplink channel repetitions for transmitting the bundled ACK feedback; may receive an explicit indication of the bundling configuration; may receive a set of possible bundling configurations and DCI signals that correspond to at least one possible bundling configuration; may receive an indication of a number of uplink channel resources that can be used for transmitting the bundled ACK feedback; or a combination thereof. In some cases, the number of uplink channel resources may be based on the number of TBs scheduled.

The DCI signaling component 940 may determine a number of scheduled TBs based on a bitmap field, HARQ identification parameter, or a combination thereof, that is included in a DCI indication; may receive an ACK delay value; may receive, in a DCI indication, an explicit indication of the bundling configuration from a set of possible bundling configurations. In some cases, the explicit indication of the bundling configuration may be jointly encoded with one or more IDs associated with a HARQ bitmap to provide valid, non-redundant combinations of HARQ bitmaps and bundling configurations.

The bundling relationship component 945 may determine a bundling indication based on a bundling relationship defined for the UE. In some cases, the bundling relationship may include a relationship between a maximum number of TBs that can be scheduled by a single DCI message, a number of scheduled TBs, a bundling parameter indicating a maximum size of a TB group for the groups of TBs, a threshold value on the number of scheduled TBs to determine which bundling parameter to use, a number of uplink channel resources that can be used for transmitting the ACK feedback, an ACK delay value, a bundling enable signal, a bundling disable signal, whether interleaving of TB repetitions is enabled, a granularity for inter-TB interleaving, an interleaving pattern used, a number of uplink channel repetitions configured for the ACK feedback, or a combination thereof.

The ACK starting location component 950 may determine a starting location of the resource locations and the instances in time for transmitting the bundled ACK feedback based on an ACK scheduling delay field received in the DCI message, a number of subframes for the bundled ACK feedback, a number of downlink transmission subframes based on a repetition number field and resource assignment field, a minimum time interval between an end of the set of TBs and a start of the bundled ACK feedback, or a combination thereof. Additionally or alternatively, the ACK starting location component 950 may determine a starting location of the resource locations and the instances in time for transmitting the bundled ACK feedback based on an ACK scheduling delay field received in the DCI message, a number of subframes for the bundled ACK feedback, a granularity of interleaving indicating a number of repetitions of a downlink channel used as a base unit for inter-TB interleaving, a minimum time interval between an end of the set of TBs and a start of the bundled ACK feedback, or a combination thereof. In some cases, the minimum time interval between the end of the set of TBs and the start of the bundled ACK feedback may be fixed, equal to ACK scheduling delay field, or a combination thereof.

In some examples, the ACK starting location component 950 may determine a first starting location for transmitting a first bundled ACK feedback for a first group of TBs of the set of TBs, where the first starting location is based on a first constraint type, and may determine a second starting location for transmitting one or more additional bundled ACK feedbacks for remaining groups of TBs after the first group of TBs, where the second starting location is based on a second constraint type. For example, the first constraint type may include a first minimum time interval between an end of the first group of TBs and a start of the first bundled ACK feedback, a second minimum interval between an end of a last TB of the set of TBs and the start of the first bundled ACK feedback, or a combination thereof. Additionally, the second constraint type may include a third minimum time interval between an end of a corresponding group of TBs from the remaining groups of TBs and a start of one of the additional bundled ACK feedbacks for the corresponding group of TBs, a fourth minimum time interval between an end of a previous bundled ACK feedback and the start of one of the additional bundled ACK feedbacks, the number of downlink transmission subframes based on the repetition number field and resource assignment field, or a combination thereof.

Figure 10:
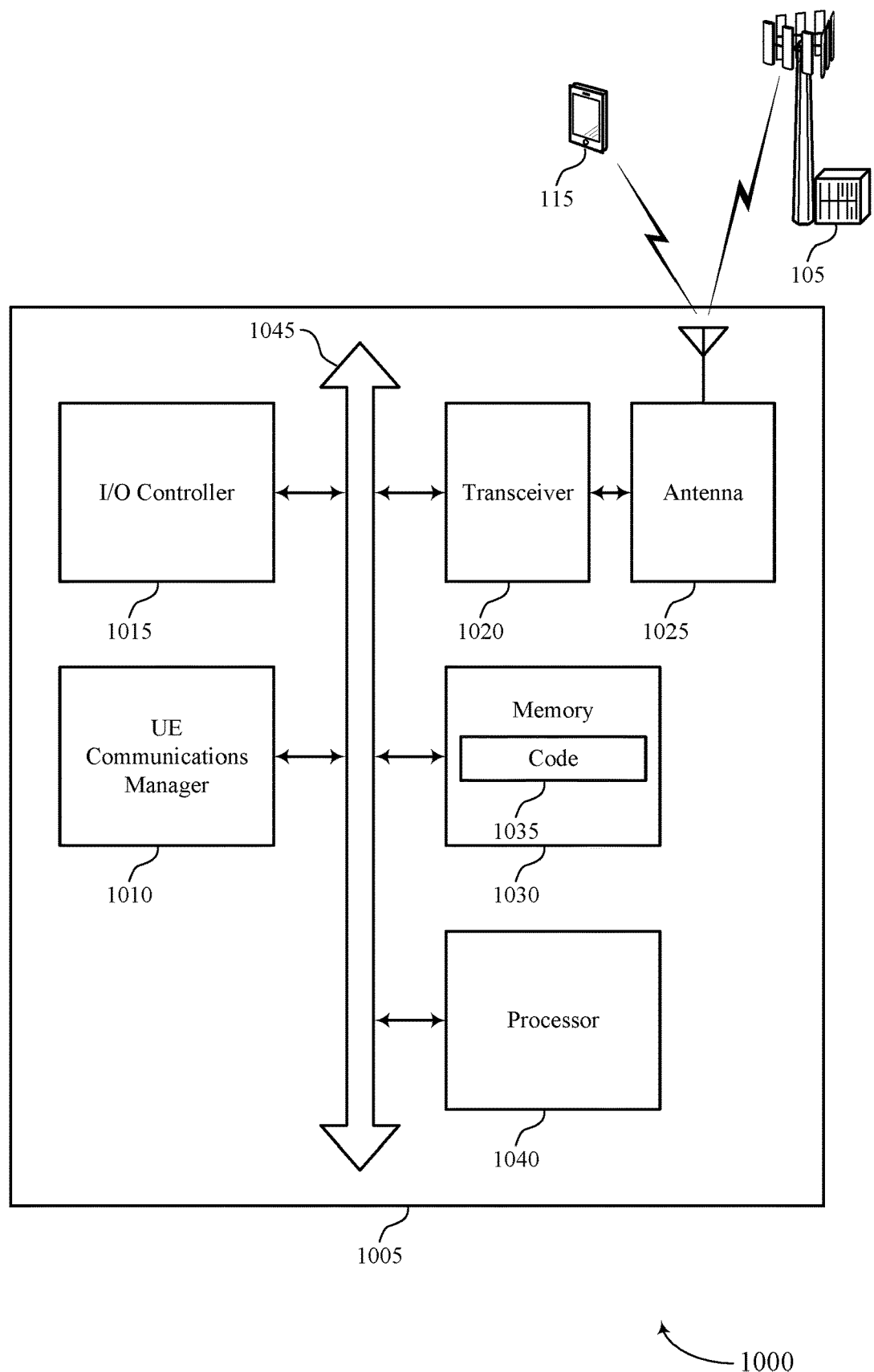
FIG. 10 shows a diagram of a system including a device that supports bundling and timeline determination for multiple TBs scheduled by a single DCI message in accordance with aspects of the present disclosure.

FIG. 10 shows a diagram of a system 1000 including a device 1005 that supports bundling and timeline determination for multiple TBs scheduled by a single DCI message in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE communications manager 1010, an I/O controller 1015, a transceiver 1020, an antenna 1025, memory 1030, and a processor 1040. These components may be in electronic communication via one or more buses (e.g., bus 1045).

The UE communications manager 1010 may receive a DCI message scheduling the UE to receive a set of TBs. In some cases, the UE communications manager 1010 may identify a bundling configuration for grouping individual ones of the set of TBs into groups and for reporting bundled ACK feedback for each of the groups of TBs. Additionally, the UE communications manager 1010 may determine resource locations and instances in time for transmitting the bundled ACK feedback for each of the groups of TBs. Accordingly, the UE communications manager 1010 may receive the set of TBs. Subsequently, the UE communications manager 1010 may transmit the bundled ACK feedback for each of the groups of TBs based on the determined resource locations and instances in time.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting bundling and timeline determination for multiple TBs scheduled by a single DCI message).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
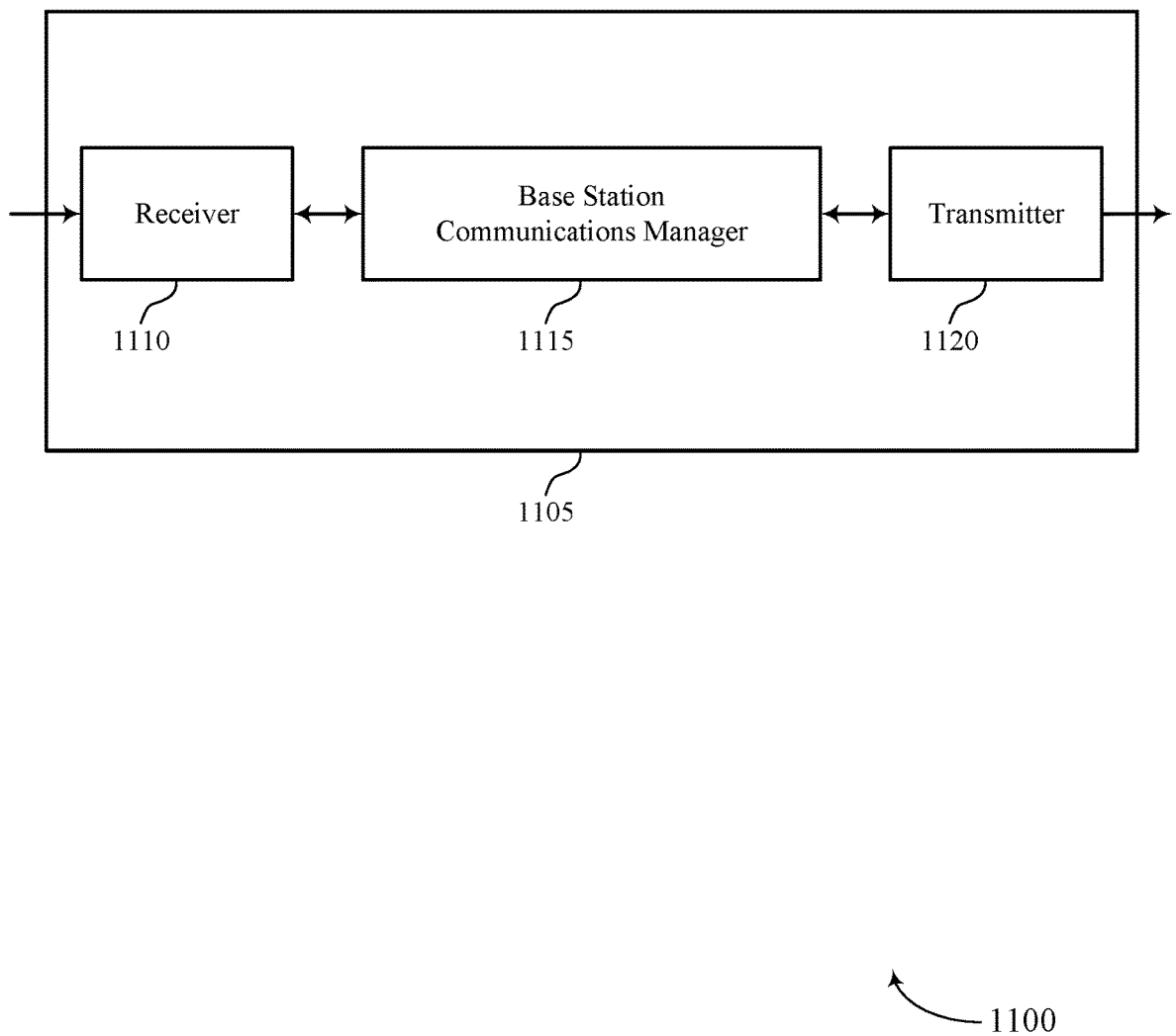
FIGS. 11 and 12 show block diagrams of devices that support bundling and timeline determination for multiple TBs scheduled by a single DCI message in accordance with aspects of the present disclosure.

FIG. 11 shows a block diagram 1100 of a device 1105 that supports bundling and timeline determination for multiple TBs scheduled by a single DCI message in accordance with aspects of the present disclosure. The device 1105 may be an example of aspects of a base station 105 as described herein. The device 1105 may include a receiver 1110, a base station communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to bundling and timeline determination for multiple TBs scheduled by a single DCI message, etc.). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 may transmit, to a UE, a DCI message scheduling the UE to receive a set of TBs. Additionally, the base station communications manager 1115 may transmit, to the UE, a bundling indication to enable the UE to group individual ones of the set of TBs into groups and for the UE to transmit bundled ACK feedback for each of the groups of TBs. In some cases, the base station communications manager 1115 may transmit, to the UE, the set of TBs. Subsequently, the base station communications manager 1115 may receive, from the UE, the bundled ACK feedback for each of the groups of TBs. The base station communications manager 1115 may be an example of aspects of the base station communications manager 1410 described herein.

The base station communications manager 1115, or its sub-components, may be implemented in hardware, code (e.g., software or firmware) executed by a processor, or any combination thereof. If implemented in code executed by a processor, the functions of the base station communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1115, or its sub-components, may be physically located at various positions, including being distributed such that portions of functions are implemented at different physical locations by one or more physical components. In some examples, the base station communications manager 1115, or its sub-components, may be a separate and distinct component in accordance with various aspects of the present disclosure. In some examples, the base station communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
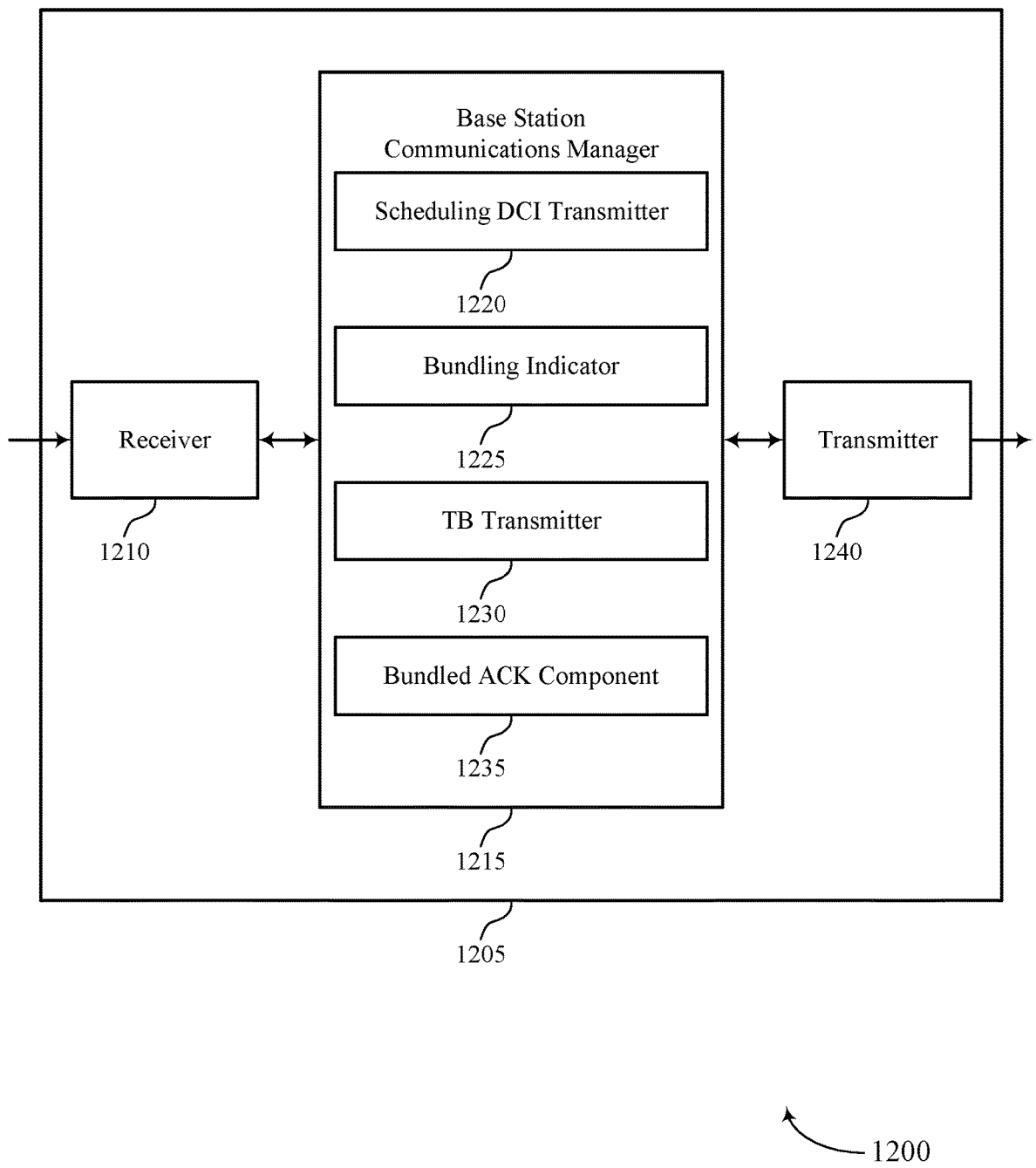

FIG. 12 shows a block diagram 1200 of a device 1205 that supports bundling and timeline determination for multiple TBs scheduled by a single DCI message in accordance with aspects of the present disclosure. The device 1205 may be an example of aspects of a device 1105, or a base station 105 as described herein. The device 1205 may include a receiver 1210, a base station communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to bundling and timeline determination for multiple TBs scheduled by a single DCI message, etc.). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may be an example of aspects of the base station communications manager 1115 as described herein. The base station communications manager 1215 may include a scheduling DCI transmitter 1220, a bundling indicator 1225, a TB transmitter 1230, and a bundled ACK component 1235. The base station communications manager 1215 may be an example of aspects of the base station communications manager 1410 described herein.

The scheduling DCI transmitter 1220 may transmit, to a UE, a DCI message scheduling the UE to receive a set of TBs.

The bundling indicator 1225 may transmit, to the UE, a bundling indication to enable the UE to group individual ones of the set of TBs into groups and for the UE to transmit bundled ACK feedback for each of the groups of TBs.

The TB transmitter 1230 may transmit, to the UE, the set of TBs.

The bundled ACK component 1235 may receive, from the UE, the bundled ACK feedback for each of the groups of TBs.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
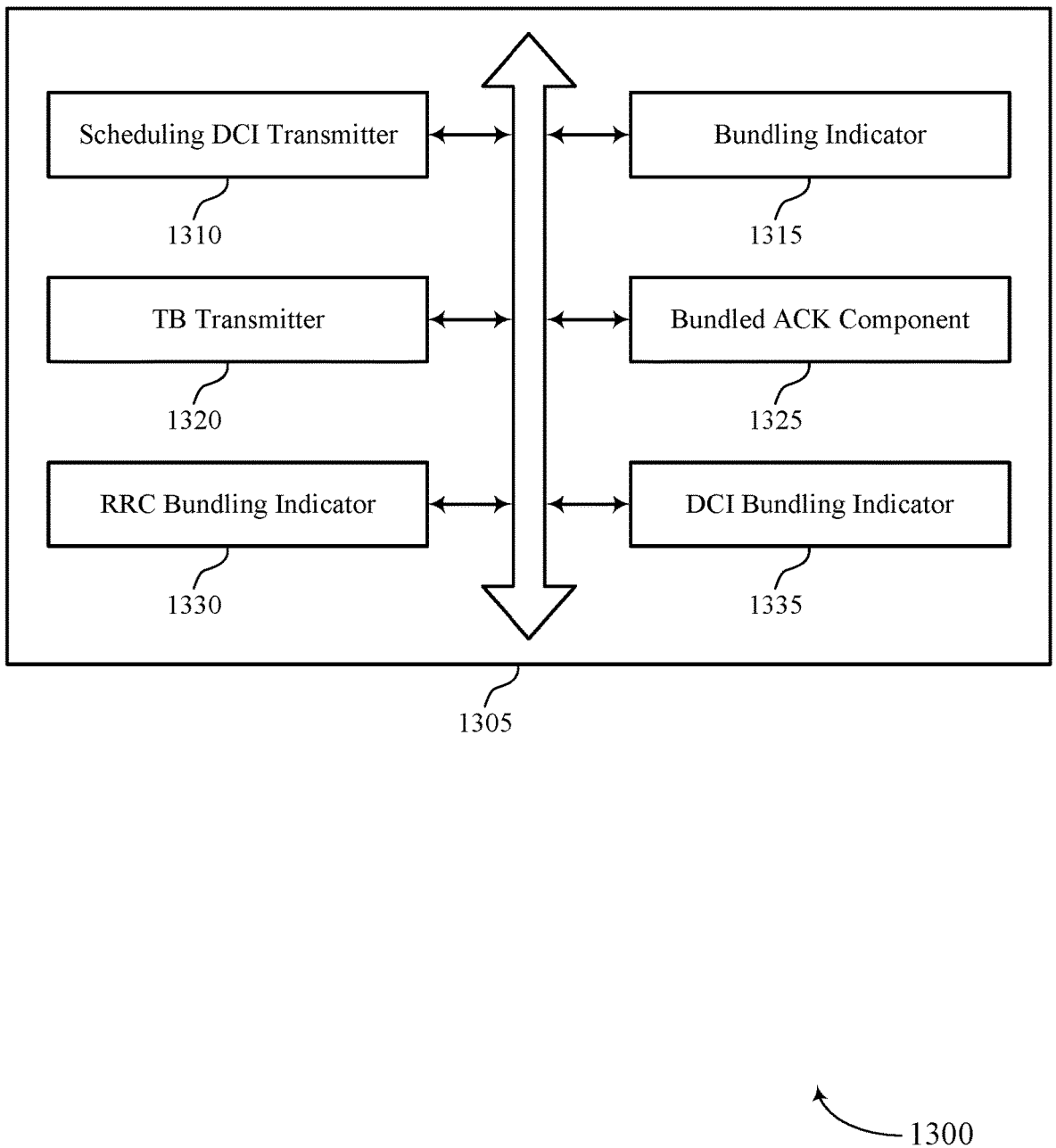
FIG. 13 shows a block diagram of a base station communications manager that supports bundling and timeline determination for multiple TBs scheduled by a single DCI message in accordance with aspects of the present disclosure.

FIG. 13 shows a block diagram 1300 of a base station communications manager 1305 that supports bundling and timeline determination for multiple TBs scheduled by a single DCI message in accordance with aspects of the present disclosure. The base station communications manager 1305 may be an example of aspects of a base station communications manager 1115, a base station communications manager 1215, or a base station communications manager 1410 described herein. The base station communications manager 1305 may include a scheduling DCI transmitter 1310, a bundling indicator 1315, a TB transmitter 1320, a bundled ACK component 1325, a RRC bundling indicator 1330, and a DCI bundling indicator 1335. Each of these modules may communicate, directly or indirectly, with one another (e.g., via one or more buses).

The scheduling DCI transmitter 1310 may transmit, to a UE, a DCI message scheduling the UE to receive a set of TBs.

The bundling indicator 1315 may transmit, to the UE, a bundling indication to enable the UE to group individual ones of the set of TBs into groups and for the UE to transmit bundled ACK feedback for each of the groups of TBs. In some cases, the bundling indication may be transmitted via RRC signaling, a DCI indication, or a combination thereof. Additionally, a number of TBs in each TB group may be less than the total number of TBs in the set of TBs, and the sum of the TBs from each TB group may be equal to the total number of TBs in the set of TBs.

The TB transmitter 1320 may transmit, to the UE, the set of TBs.

The bundled ACK component 1325 may receive, from the UE, the bundled ACK feedback for each of the groups of TBs. In some cases, the bundled ACK feedback may be received at resource locations based on resource and time constraints including a gap for the UE to decode a downlink channel between the UE receiving the downlink channel and the UE transmitting the bundled ACK feedback, the ACK feedback for each TB not overlapping in time, a half-duplex capability of the UE, a full duplex capability of the UE, or a combination thereof. Additionally or alternatively, the bundled ACK feedback may be received at a starting location based on an ACK scheduling delay field transmitted in the DCI message, a number of subframes for the bundled ACK feedback, a number of downlink transmission subframes based on a repetition number field and resource assignment field, a minimum time interval between an end of the set of TBs and a start of the bundled ACK feedback, or a combination thereof. In some cases, the bundled ACK feedback may be received at a starting location based on an ACK scheduling delay field transmitted in the DCI message, a number of subframes for the bundled ACK feedback, a granularity of interleaving indicating a number of repetitions of a downlink channel used as a base unit for inter-TB interleaving, a minimum time interval between an end of the set of TBs and a start of the bundled ACK feedback, or a combination thereof.

Additionally or alternatively, the bundled ACK feedback may be received at resource locations based on a maximum number of TBs that can be scheduled by a single DCI message, a number of scheduled TBs, a bundling parameter indicating a maximum size of a TB group for the groups of TBs, a threshold value on the number of scheduled TBs to determine which bundling parameter to use, a number of uplink channel resources that can be used for transmitting the bundled ACK feedback, an ACK delay value, or a combination thereof. In some cases, the bundled ACK feedback may be received at resource locations based on a bundling enable signal or a bundling disable signal. Additionally, the bundled ACK feedback may be received at resource locations based on whether interleaving of TB repetition is enabled, a granularity for inter-TB interleaving, an interleaving pattern used, a number of uplink channel repetitions configured for the bundled ACK feedback, or a combination thereof.

The RRC bundling indicator 1330 may transmit a bundling parameter indicating a maximum size of a TB group for the groups of TBs; may transmit multiple bundling parameters indicating maximum sizes of TB groups for different numbers of scheduled TBs; may transmit multiple bundling parameters indicating maximum sizes of TB groups for different numbers of scheduled TBs and threshold values on the number of scheduled TBs to determine which bundling parameter to use, the threshold values based on a number of uplink channel repetitions for the UE to transmit the bundled ACK feedback; may transmit an explicit indication of a bundling configuration; may transmit a set of possible bundling configurations and DCI signals that correspond to at least one possible bundling configuration; may transmit an indication of a number of uplink channel resources that can be used for the UE to transmit the bundled ACK feedback; or a combination thereof. In some cases, the number of uplink channel resources may be based on the number of TBs scheduled.

The DCI bundling indicator 1335 may transmit an indication of a number of scheduled TBs based on a bitmap field, a HARQ identification parameter, or a combination thereof, that is included in a DCI indication; may transmit an ACK delay value; may transmit, in a DCI indication, an explicit indication of the bundling configuration from a set of possible bundling configurations. In some cases, the explicit indication of the bundling configuration may be jointly encoded with one or more IDs associated with a HARQ bitmap to provide valid, non-redundant combinations of HARQ bitmaps and bundling configurations.

Figure 14:
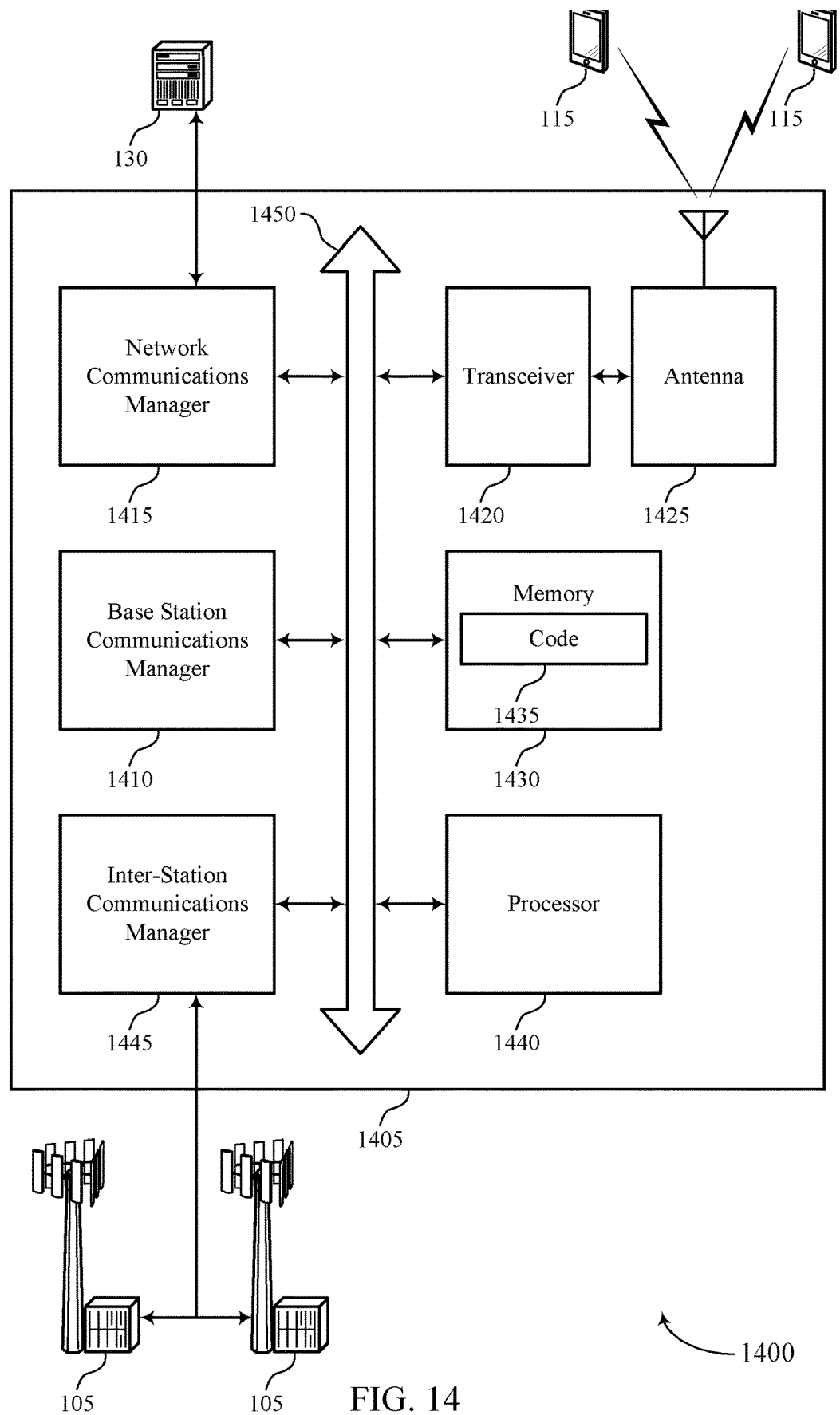
FIG. 14 shows a diagram of a system including a device that supports bundling and timeline determination for multiple TBs scheduled by a single DCI message in accordance with aspects of the present disclosure.

FIG. 14 shows a diagram of a system 1400 including a device 1405 that supports bundling and timeline determination for multiple TBs scheduled by a single DCI message in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The base station communications manager 1410 may transmit, to a UE, a DCI message scheduling the UE to receive a set of TBs. Additionally, the base station communications manager 1410 may transmit, to the UE, a bundling indication to enable the UE to group individual ones of the set of TBs into groups and for the UE to transmit bundled ACK feedback for each of the groups of TBs. In some cases, the base station communications manager 1410 may transmit, to the UE, the set of TBs. Subsequently, the base station communications manager 1410 may receive, from the UE, the bundled ACK feedback for each of the groups of TBs.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic device, a discrete hardware component, or any combination thereof).

In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting bundling and timeline determination for multiple TBs scheduled by a single DCI message).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
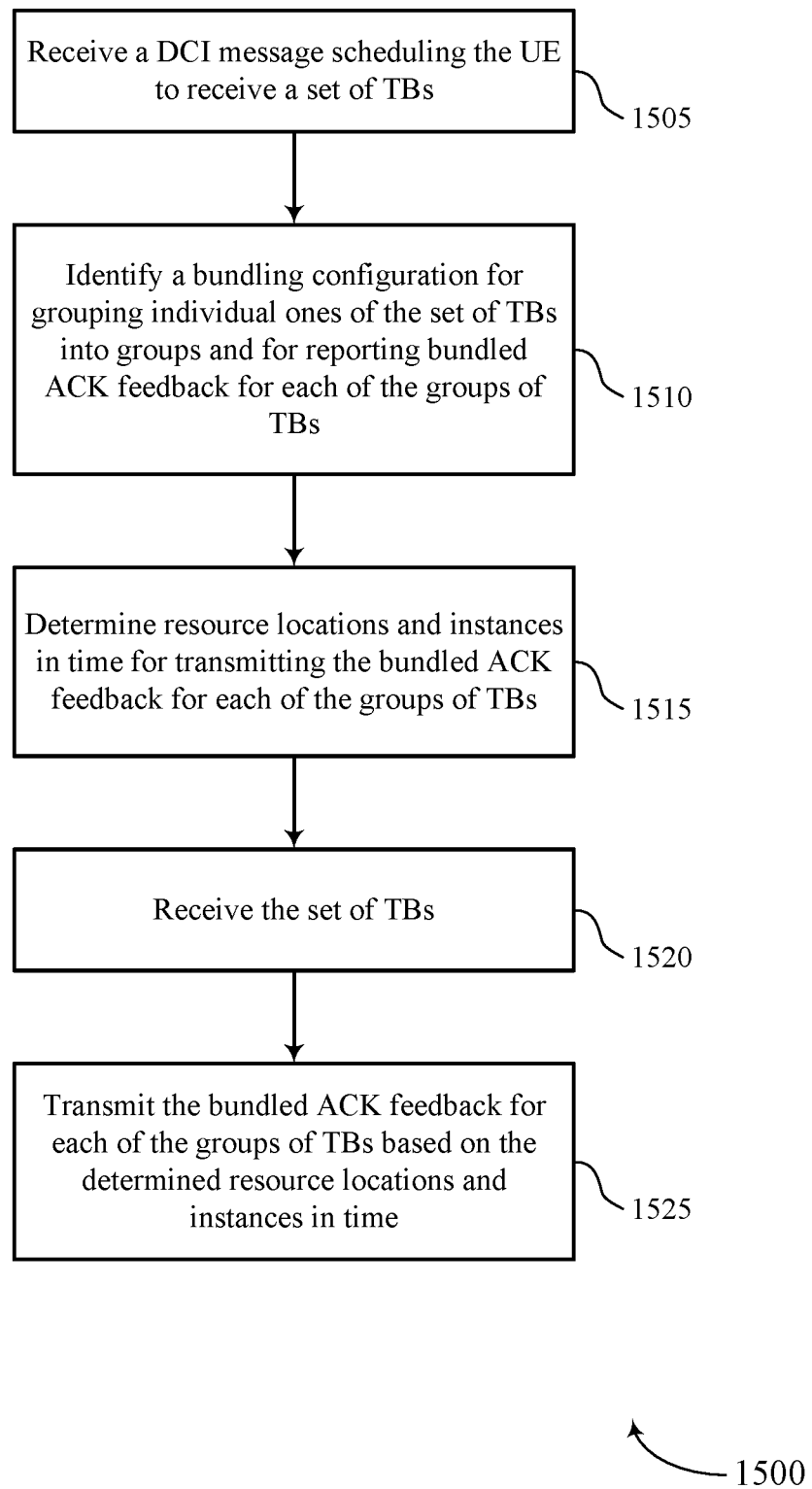
FIGS. 15 through 18 show flowcharts illustrating methods that support bundling and timeline determination for multiple TBs scheduled by a single DCI message in accordance with aspects of the present disclosure.

FIG. 15 shows a flowchart illustrating a method 1500 that supports bundling and timeline determination for multiple TBs scheduled by a single DCI message in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a DCI message scheduling the UE to receive a set of TBs. The operations of 1505 may be performed according to the methods described herein. In some examples, aspects of the operations of 1505 may be performed by a TB scheduling DCI component as described with reference to FIGS. 7 through 10.

At 1510, the UE may identify a bundling configuration for grouping individual ones of the set of TBs into groups and for reporting bundled ACK feedback for each of the groups of TBs. The operations of 1510 may be performed according to the methods described herein. In some examples, aspects of the operations of 1510 may be performed by a bundling configuration identifier as described with reference to FIGS. 7 through 10.

At 1515, the UE may determine resource locations and instances in time for transmitting the bundled ACK feedback for each of the groups of TBs. The operations of 1515 may be performed according to the methods described herein. In some examples, aspects of the operations of 1515 may be performed by an ACK transmission locator as described with reference to FIGS. 7 through 10.

At 1520, the UE may receive the set of TBs. The operations of 1520 may be performed according to the methods described herein. In some examples, aspects of the operations of 1520 may be performed by a TB receiver as described with reference to FIGS. 7 through 10.

At 1525, the UE may transmit the bundled ACK feedback for each of the groups of TBs based on the determined resource locations and instances in time. The operations of 1525 may be performed according to the methods described herein. In some examples, aspects of the operations of 1525 may be performed by a bundled ACK feedback component as described with reference to FIGS. 7 through 10.

Figure 16:
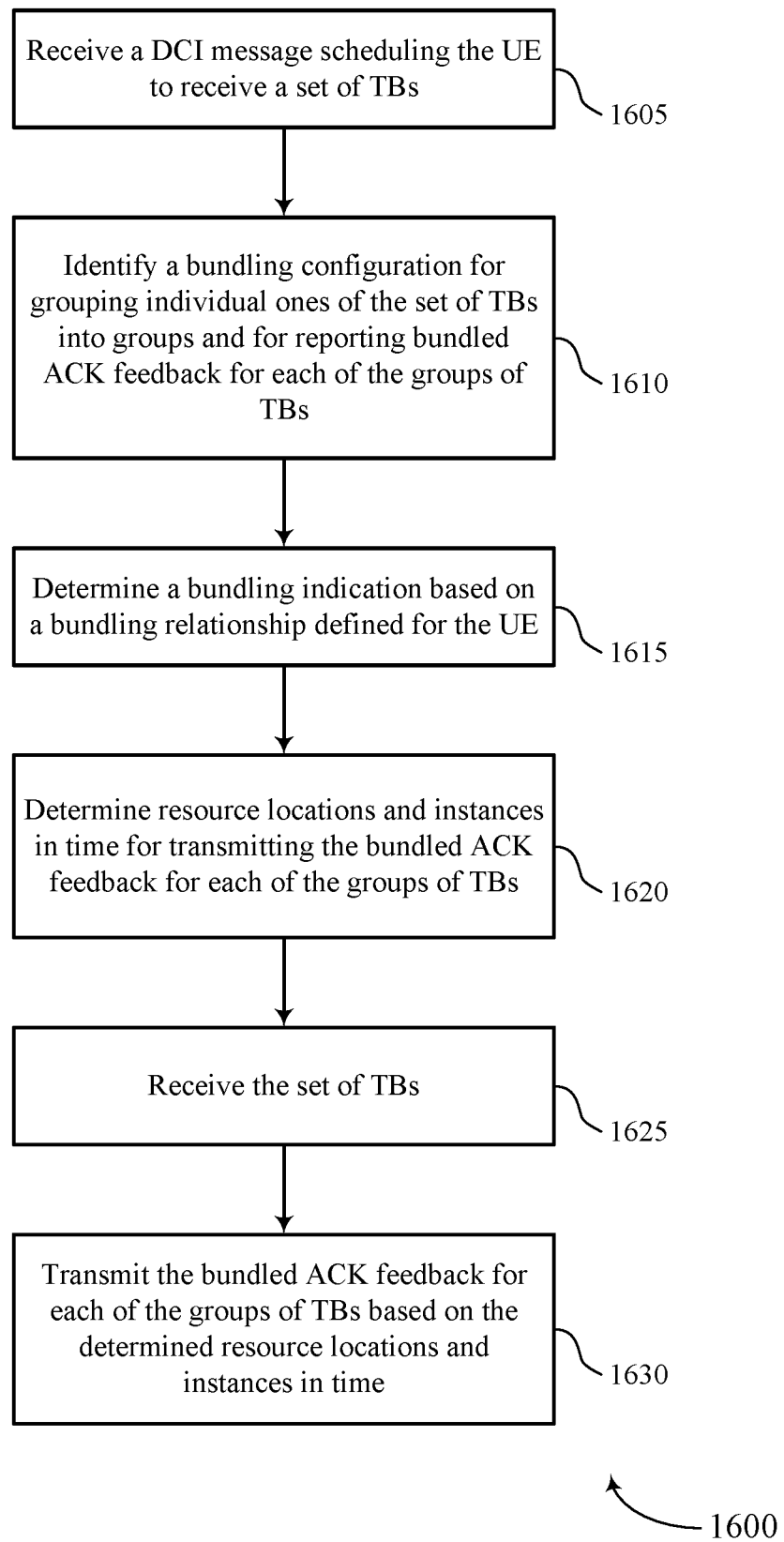

FIG. 16 shows a flowchart illustrating a method 1600 that supports bundling and timeline determination for multiple TBs scheduled by a single DCI message in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a DCI message scheduling the UE to receive a set of TBs. The operations of 1605 may be performed according to the methods described herein. In some examples, aspects of the operations of 1605 may be performed by a TB scheduling DCI component as described with reference to FIGS. 7 through 10.

At 1610, the UE may identify a bundling configuration for grouping individual ones of the set of TBs into groups and for reporting bundled ACK feedback for each of the groups of TBs. The operations of 1610 may be performed according to the methods described herein. In some examples, aspects of the operations of 1610 may be performed by a bundling configuration identifier as described with reference to FIGS. 7 through 10.

At 1615, the UE may determine a bundling indication based on a bundling relationship defined for the UE. The operations of 1615 may be performed according to the methods described herein. In some examples, aspects of the operations of 1615 may be performed by a bundling relationship component as described with reference to FIGS. 7 through 10.

At 1620, the UE may determine resource locations and instances in time for transmitting the bundled ACK feedback for each of the groups of TBs. The operations of 1620 may be performed according to the methods described herein. In some examples, aspects of the operations of 1620 may be performed by an ACK transmission locator as described with reference to FIGS. 7 through 10.

At 1625, the UE may receive the set of TBs. The operations of 1625 may be performed according to the methods described herein. In some examples, aspects of the operations of 1625 may be performed by a TB receiver as described with reference to FIGS. 7 through 10.

At 1630, the UE may transmit the bundled ACK feedback for each of the groups of TBs based on the determined resource locations and instances in time. The operations of 1630 may be performed according to the methods described herein. In some examples, aspects of the operations of 1630 may be performed by a bundled ACK feedback component as described with reference to FIGS. 7 through 10.

Figure 17:
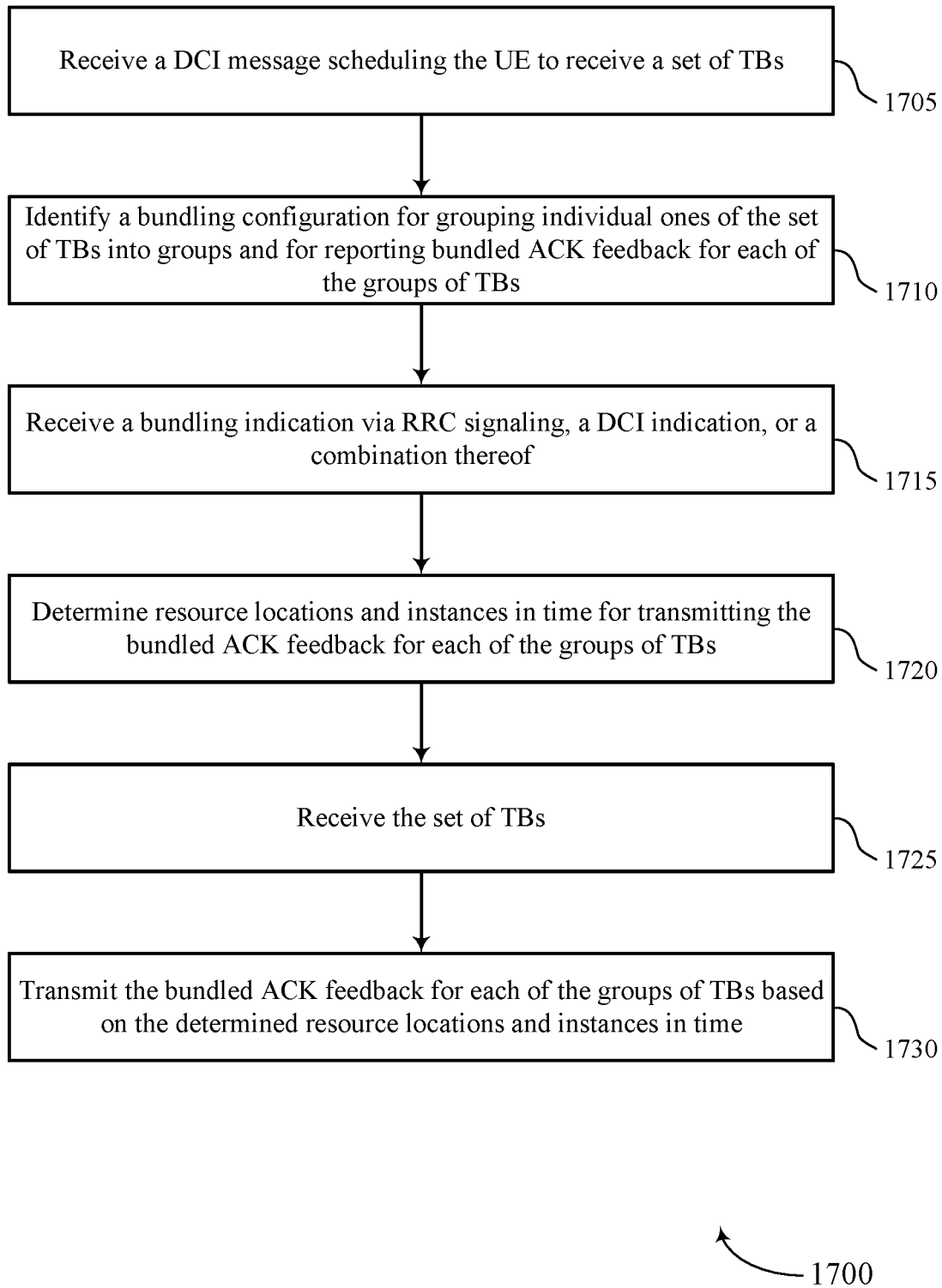

FIG. 17 shows a flowchart illustrating a method 1700 that supports bundling and timeline determination for multiple TBs scheduled by a single DCI message in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive a DCI message scheduling the UE to receive a set of TBs. The operations of 1705 may be performed according to the methods described herein. In some examples, aspects of the operations of 1705 may be performed by a TB scheduling DCI component as described with reference to FIGS. 7 through 10.

At 1710, the UE may identify a bundling configuration for grouping individual ones of the set of TBs into groups and for reporting bundled ACK feedback for each of the groups of TBs. The operations of 1710 may be performed according to the methods described herein. In some examples, aspects of the operations of 1710 may be performed by a bundling configuration identifier as described with reference to FIGS. 7 through 10.

At 1715, the UE may receive a bundling indication via RRC signaling, a DCI indication, or a combination thereof. The operations of 1715 may be performed according to the methods described herein. In some examples, aspects of the operations of 1715 may be performed by a bundling configuration identifier as described with reference to FIGS. 7 through 10.

At 1720, the UE may determine resource locations and instances in time for transmitting the bundled ACK feedback for each of the groups of TBs. The operations of 1720 may be performed according to the methods described herein. In some examples, aspects of the operations of 1720 may be performed by an ACK transmission locator as described with reference to FIGS. 7 through 10.

At 1725, the UE may receive the set of TBs. The operations of 1725 may be performed according to the methods described herein. In some examples, aspects of the operations of 1725 may be performed by a TB receiver as described with reference to FIGS. 7 through 10.

At 1730, the UE may transmit the bundled ACK feedback for each of the groups of TBs based on the determined resource locations and instances in time. The operations of 1730 may be performed according to the methods described herein. In some examples, aspects of the operations of 1730 may be performed by a bundled ACK feedback component as described with reference to FIGS. 7 through 10.

Figure 18:
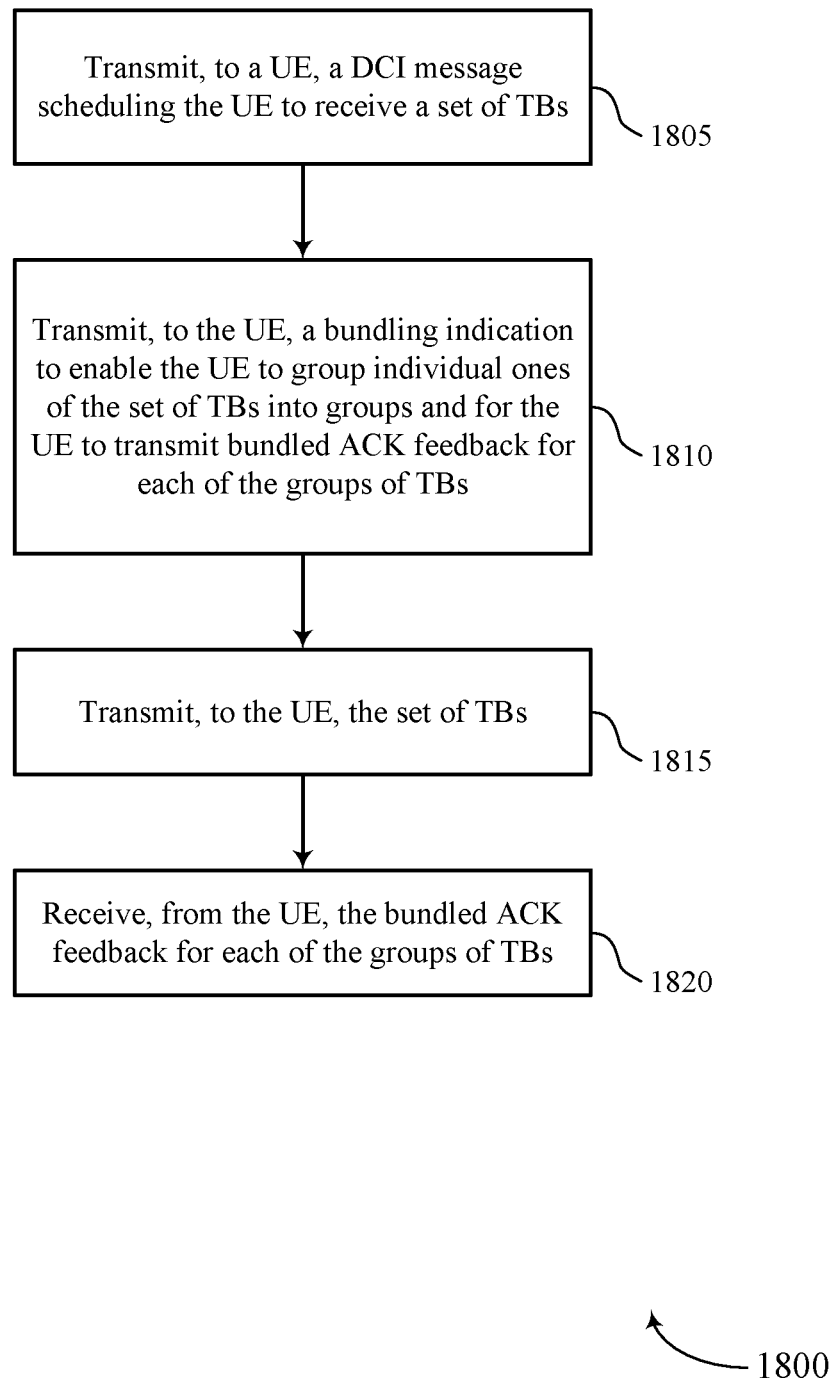

FIG. 18 shows a flowchart illustrating a method 1800 that supports bundling and timeline determination for multiple TBs scheduled by a single DCI message in accordance with aspects of the present disclosure. The operations of method 1800 may be implemented by a base station 105 or its components as described herein. For example, the operations of method 1800 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a DCI message scheduling the UE to receive a set of TBs. The operations of 1805 may be performed according to the methods described herein. In some examples, aspects of the operations of 1805 may be performed by a scheduling DCI transmitter as described with reference to FIGS. 11 through 14.

At 1810, the base station may transmit, to the UE, a bundling indication to enable the UE to group individual ones of the set of TBs into groups and for the UE to transmit bundled ACK feedback for each of the groups of TBs. The operations of 1810 may be performed according to the methods described herein. In some examples, aspects of the operations of 1810 may be performed by a bundling indicator as described with reference to FIGS. 11 through 14.

At 1815, the base station may transmit, to the UE, the set of TBs. The operations of 1815 may be performed according to the methods described herein. In some examples, aspects of the operations of 1815 may be performed by a TB transmitter as described with reference to FIGS. 11 through 14.

At 1820, the base station may receive, from the UE, the bundled ACK feedback for each of the groups of TBs. The operations of 1820 may be performed according to the methods described herein. In some examples, aspects of the operations of 1820 may be performed by a bundled ACK component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving a downlink control information message scheduling the UE to receive a plurality of transport blocks, wherein the downlink control information message comprises an explicit indication of a bundling configuration from a plurality of possible bundling configurations, the
    bundling configuration for grouping individual ones of the plurality of transport blocks into groups and for reporting bundled acknowledgment feedback for each of the groups of transport blocks;
    receiving the plurality of transport blocks; and
    transmitting the bundled acknowledgment feedback for each of the groups of transport blocks based at least in part on receiving the plurality of transport blocks.

2. A method for wireless communications at a user equipment (UE), comprising:
    receiving a downlink control information message scheduling the UE to receive a plurality of transport blocks, the downlink control information message comprising a bundling configuration for grouping individual ones of the plurality of transport blocks into groups and for reporting bundled acknowledgment feedback for each of the groups of transport blocks;
    determining instances in time for transmitting the bundled acknowledgment feedback for each of the groups of transport blocks based at least in part on one or more time constraints simultaneously being satisfied, wherein the one or more time constraints comprise at least a first time constraint and a second time constraint;
    receiving the plurality of transport blocks; and
    transmitting the bundled acknowledgment feedback for each of the groups of transport blocks based at least in part on the determined instances in time.

3. A user equipment (UE), comprising:
    one or more memories storing processor-executable code; and
    one or more processors coupled with the one or more memories and individually or collectively operable to execute the code to cause the UE to:
        receive a downlink control information message scheduling the UE to receive a plurality of transport blocks, wherein the downlink control information message comprises an explicit indication of a bundling configuration from a plurality of possible bundling configurations, the
        bundling configuration for grouping individual ones of the plurality of transport blocks into groups and for reporting bundled acknowledgment feedback for each of the groups of transport blocks;
        receive the plurality of transport blocks; and
        transmit the bundled acknowledgment feedback for each of the groups of transport blocks based at least in part on receiving the plurality of transport blocks.

4. The UE of claim 3, wherein the one or more processors are individually or collectively further operable to execute the code to cause the UE to:
    determine a number of scheduled transport blocks based at least in part on a downlink control information indication, wherein the bundling configuration is based at least in part on the number of scheduled transport blocks.

5. The UE of claim 4, wherein the number of scheduled transport blocks is determined based at least in part on a bitmap field, hybrid automatic repeat request identification parameter, or a combination thereof included in the downlink control information indication.

6. The UE of claim 3, wherein, the one or more processors are individually or collectively further operable to execute the code to cause the UE to:
determine a number of scheduled transport blocks, wherein the explicit indication of the bundling configuration is based at least in part on the number of scheduled transport blocks.

7. The UE of claim 3, wherein the explicit indication of the bundling configuration is jointly encoded with one or more identifiers associated with a hybrid automatic repeat request bitmap to provide valid, non-redundant combinations of hybrid automatic repeat request bitmaps and bundling configurations.

8. The UE of claim 3, wherein a number of transport blocks in each group of transport blocks is less than a total number of transport blocks in the plurality of transport blocks, and a sum of transport blocks from each group of transport blocks is equal to the total number of transport blocks in the plurality of transport blocks.

9. The UE of claim 3, wherein the one or more processors are individually or collectively further operable to execute the code to cause the UE to:
receive a bundling parameter indicating a maximum size of a transport block group for the groups of transport blocks.

10. The UE of claim 3, wherein the one or more processors are individually or collectively further operable to execute the code to cause the UE to:
receive multiple bundling parameters indicating maximum sizes of transport block groups for different numbers of scheduled transport blocks and threshold values on a number of scheduled transport blocks to determine which bundling parameter to use, the threshold values are based at least in part on a number of uplink channel repetitions for transmitting the bundled acknowledgment feedback.

11. The UE of claim 3, the one or more processors are individually or collectively further operable to execute the code to cause the UE to:
receive an indication of a number of uplink channel resources available for transmitting the bundled acknowledgment feedback.

12. The UE of claim 11, wherein the number of uplink channel resources is based at least in part on a number of transport blocks scheduled.

13. The UE of claim 3, wherein the one or more processors are individually or collectively further operable to execute the code to cause the UE to:
receive an acknowledgment delay value.

14. The UE of claim 3, wherein the one or more processors are individually or collectively further operable to execute the code to cause the UE to:
determine a bundling indication based at least in part on a bundling relationship defined for the UE.

15. The UE of claim 14, wherein the bundling relationship comprises a relationship between a maximum number of transport blocks scheduled by a single downlink control information message, an actual number of scheduled transport blocks, a bundling parameter indicating a maximum size of a transport block group for the groups of transport blocks, a threshold value on the actual number of scheduled transport blocks to determine which bundling parameter to use, a number of uplink channel resources available for transmitting the bundled acknowledgment feedback, an acknowledgment delay value, a bundling enable signal, a bundling disable signal, whether interleaving of transport block repetitions is enabled, a granularity for inter-transport block interleaving, an interleaving pattern used, a number of uplink channel repetitions configured for the bundled acknowledgment feedback, or a combination thereof.

16. A user equipment (UE), comprising:
one or more memories storing processor-executable code; and
one or more processors coupled with the one or more memories and individually or collectively operable to execute the code to cause the UE to:
receive a downlink control information message scheduling the UE to receive a plurality of transport blocks, the downlink control information message comprising a bundling configuration for grouping individual ones of the plurality of transport blocks into groups and for reporting bundled acknowledgment feedback for each of the groups of transport blocks;
determine instances in time for transmitting the bundled acknowledgment feedback for each of the groups of transport blocks based at least in part on one or more time constraints simultaneously being satisfied, wherein the one or more time constraints comprise at least a first time constraint and a second time constraint;
receive the plurality of transport blocks; and
transmit the bundled acknowledgment feedback for each of the groups of transport blocks based at least in part on the determined instances in time.

17. The UE of claim 16, wherein the one or more time constraints include the first time constraint comprising a minimum gap for decoding a downlink channel between receipt of the downlink channel and transmission of the bundled acknowledgment feedback, the second time constraint comprising that the bundled acknowledgment feedback for each of the groups of transport blocks does not overlap in time, or a combination thereof.

18. The UE of claim 16, wherein the one or more time constraints include the first time constraint comprising a half-duplex capability of the UE or the second time constraint comprising a full duplex capability of the UE.

19. The UE of claim 16, wherein the one or more time constraints include the first time constraint comprising a time division duplexing mode of operation or the second time constraint comprising a frequency division duplexing mode of operation.

20. The UE of claim 16, wherein satisfying the one or more time constraints is based at least in part on a maximum number of transport blocks scheduled by a single downlink control information message, an actual number of scheduled transport blocks, a bundling parameter indicating a maximum size of a transport block group for the groups of transport blocks, a number of uplink channel resources available for transmitting the bundled acknowledgment feedback, an acknowledgment delay value, or a combination thereof.

21. The UE of claim 16, wherein satisfying the one or more time constraints is based at least in part on a bundling enable signal, a bundling disable signal, the bundling configuration, or a combination thereof.

22. The UE of claim 16, wherein satisfying the one or more time constraints is based at least in part on whether interleaving of transport block repetition is enabled, a granularity for inter-transport block interleaving, an interleaving pattern used, a number of uplink channel repetitions configured for the bundled acknowledgment feedback, or a combination thereof.

23. The UE of claim 16, wherein, the one or more processors are individually or collectively further operable to execute the code to cause the UE to:
determine a starting location of the instances in time for transmitting the bundled acknowledgment feedback based at least in part on an acknowledgment scheduling delay field received in the downlink control information message, a number of subframes for the bundled acknowledgment feedback, a number of downlink transmission subframes based on a repetition number field and resource assignment field, a minimum time interval between an end of the plurality of transport blocks and a start of the bundled acknowledgment feedback, or a combination thereof.

24. The UE of claim 23, wherein to determine the starting location of the instances in time for transmitting the bundled acknowledgment feedback, the one or more processors are individually or collectively further operable to execute the code to cause the UE to:
determine a first starting location for transmitting a first bundled acknowledgment feedback for a first group of transport blocks of the plurality of transport blocks, wherein the first starting location is based at least in part on the first constraint; and
determine a second starting location for transmitting one or more additional bundled acknowledgment feedbacks for remaining groups of transport blocks after the first group of transport blocks, wherein the second starting location is based at least in part on the second constraint.

25. The UE of claim 24, wherein:
the first constraint comprises a first minimum time interval between an end of the first group of transport blocks and a start of the first bundled acknowledgment feedback, a second minimum interval between an end of a last transport block of the plurality of transport blocks and the start of the first bundled acknowledgment feedback, or a combination thereof, and
the second constraint comprises a third minimum time interval between an end of a corresponding group of transport blocks from the remaining groups of transport blocks and a start of one of the additional bundled acknowledgment feedbacks for the corresponding group of transport blocks, a fourth minimum time interval between an end of a previous bundled acknowledgment feedback and the start of one of the additional bundled acknowledgment feedbacks, the number of downlink transmission subframes based on the repetition number field and resource assignment field, or a combination thereof.

26. The UE of claim 23, wherein the minimum time interval between the end of the plurality of transport blocks and the start of the bundled acknowledgment feedback is fixed, equal to the acknowledgment scheduling delay field, or a combination thereof.

27. The UE of claim 16, wherein, the one or more processors are individually or collectively further operable to execute the code to cause the UE to:
determine a starting location of the instances in time for transmitting the bundled acknowledgment feedback based at least in part on an acknowledgment scheduling delay field received in the downlink control information message, a number of subframes for the bundled acknowledgment feedback, a granularity of interleaving indicating a number of repetitions of a downlink channel used as a base unit for inter-transport block interleaving, a minimum time interval between an end of the plurality of transport blocks and a start of the bundled acknowledgment feedback, or a combination thereof.

* * * * *